(12) United States Patent
Dymetman et al.

(10) Patent No.: US 6,330,976 B1
(45) Date of Patent: Dec. 18, 2001

(54) MARKING MEDIUM AREA WITH ENCODED IDENTIFIER FOR PRODUCING ACTION THROUGH NETWORK

(75) Inventors: Marc Dymetman, Grenoble (FR); Max Copperman, Santa Cruz, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/276,085

(22) Filed: Mar. 25, 1999

Related U.S. Application Data

(63) Continuation-in-part of application No. PCT/US98/20597, filed on Sep. 30, 1998.

(30) Foreign Application Priority Data

| Apr. 1, 1998 | (GB) | 9806973 |
| Apr. 1, 1998 | (GB) | 9806977 |
| Apr. 1, 1998 | (GB) | 9807001 |

(51) Int. Cl.[7] ................................................. G06K 19/00
(52) U.S. Cl. ........................................... 235/487; 235/494
(58) Field of Search .................................... 235/375, 487, 235/494

(56) References Cited

U.S. PATENT DOCUMENTS

| 5,321,396 | 6/1994 | Lamming et al. | 340/825.49 |
| 5,408,076 | * 4/1995 | Griffanti | 235/375 |
| 5,535,063 | 7/1996 | Lamming | 360/4 |
| 5,539,665 | 7/1996 | Lamming et al. | 364/514 R |
| 5,661,506 | 8/1997 | Lazzouni et al. | 345/179 |
| 5,937,110 | 8/1999 | Petrie et al. | 382/306 |

FOREIGN PATENT DOCUMENTS

| 0 495 622 A2 | 7/1992 | (EP) . |
| 0 495 612 B1 | 4/1996 | (EP) . |
| 0 837 406 A2 | 4/1998 | (EP) . |
| 0 837 406 A3 | 4/1998 | (EP) . |

OTHER PUBLICATIONS

Arai, Toshifumi et al. "PaperLink: A Technique for Hyperlinking from real Paper to Electronic Content," Proceedings of CHI 97 Human Factors in Computing Seystems, Atlanta, Georgia; Mar. 22–27 1997, pp. 327–334.

"Digital Ink," http://www.ices.cmu.edu/design/digitalink.html published on the Internet Jun 9, 2000, Intitute for Complex Engineered Systems at Carnegie Mellon University.

Dymetman, Marc et al. "Intelligent Paper," Proceedings of Electronic Publishing, Artistic Imaging, and Digital Typography: $7_{th}$ International Conference on Electronic Publishing, EP '98 Held Jointly with the $4^{th}$ International Conference on Raster Imaging and Digital Typography, RIDT '98, St. Malo, France; Mar. 30–Apr. 3, 1998, pp. 392–406.

Hinden, Robert M. "IP Next Generation Overview," Communication of the ACM, Jun. 1996, vol. 39, No. 6, pp. 61–71.

(List continued on next page.)

*Primary Examiner*—Karl D. Frech

(57) ABSTRACT

Automatic actions can be obtained through a network using an area of marking medium with machine-readable markings that encode an action/medium identifier. The action/medium identifier identifies an action that can be produced through the network, and also identifies the area of marking medium. For example, it may include a globally unique or network-wide page identifier as well as an action identifier that can be used to produce an action described by data associated with a counterpart digital page. Or it can include both a page identifier and a location identifier, with the location identifier also identifying an action that relates to the page's digital counterpart. Or it can include a document identifier and an action identifier. Or it can be a globally unique or network-wide sticker identifier that can be used to identify a document, a peripheral device, or another object to which the sticker is attached, and that also produces an action through the network.

31 Claims, 11 Drawing Sheets

OTHER PUBLICATIONS

"Hypertouch Transforms Print Media into a Web Portal: How it Works," http://www.tvi.com, published on the Internet Oct. 1, 1998 by TVI.com, Inc.

International Search Report for PCT counterpart Application No. PCT/US98/20597 with search date of Dec. 29, 1998 and mailing date of Feb. 9, 1999.

Johnson, Walter et al. "Bridging the Paper and Electronic Worlds: The Paper User Interface," Proceedings of INTER-CHI '93, Amsterdam, The Netherlands; Apr. 24–29, 1993, pp. 507–512.

Lamming, Michael G. et al. "Activity–Based Information Retrieval: Technology in Support of Human Memory," in Personal Computers and Intelligent Systems: Information Proceeding 92, Amsterdam, The Netherlands, 1992.

Mauth, Rainer "Make Digital Signaures More Secure," Byte, Oct. 1997.

"MemoPen," http://www.agusa.nuie.nagoya–u.ac.jp/research/media/MemoPen/MemoPen.html published on the Internet. No Date.

Nabeshima, Shinji et al. "Memo–Pen: A New Input Device," CHI '95 Proceedngs.

Robinson, Peter et al. "Animated Paper Documents," Proceedings of Eurographics 1997, Nov. 1997, pp. 655–658.

Robinson, Peter et al. "A Framework for Interacting with Paper," Proceedings of The European Association for Computer Graphics 18$^{th}$ Annual Conference Eurographics '97, Budapest, Hungary; Sep. 4–8, 1997, vol. 16, No. 3, pp. C329–C334.

"Smart P&P™(Smart Pen and Paper)," SIA Technology Corporation, Jul. 29, 1998.

Södergård, Caj et al. "A Pen Scanner Based System for an Easy Access to Relevant WWW Hyperlinks," TAGA '97 Conference, Quebec, Canada, May 4–7, 1997, Technical Association for Graphic Arts, 1997, pp. 63–82.

Stifelman, Lisa Joy "the Audio Notebook Paper and Pen Interaction with Structured Speech," http://www.media.mit.edu/~lisa/abstract.html published on the Internet. No date.

Stifelman, Lisa J. "Augmenting Real–World objects: A Paper–Based Audio Notebook," CHI '96, ACM, Apr. 1996, pp. 199–200.

U.S. Pat. Application No. 09/144,250 entitle "Methods and Apparatus for Camera Pen,"to L. Noah Flores et al., filed Aug. 31, 1998.

U.S. Pat. Application No. 09/144,251 entitled "Glyph Address Carpet Methods and Aparatus for Providing Location Information in a Multidimensional Address Space," to David A. Jared et al., filed Aug. 31, 1998.

U.S. Pat. Application No. 09/144518 entitled "Methods and Apparatus For Robust Decoding of Glyph Address Carpet," to David A. Jared et al., filed August 31, 1998.

U.S. Pat. Application No. 09/223,882 entitled "Multi–Level selection Methods and Apparatus Using Context identification for Embedded Data Graphical User Interfaces," to David L. Hecht, filed Dec. 31, 1998.

"What if Every printed Document Was a Direct Link to the World Wide Web?" NeoMedia Technologies. No Date.

Whittaker, Steve et al. "Filochat: Handwritten Notes Provide Access to Recorded Conversations," Proceedings of the CHI '94 Conference on Human Factors in Computing Systems, Boston, Massachusetts; Apr. 24–28, 1994, pp. 271–277.

Wildstrom, Stephen H. "A Clipboard with a Memory," Busines Week, Apr. 27, 1998.

* cited by examiner

TECHNOLOGY 1:
PAPER

MARKING MEDIUM AREA WITH ENCODED IDENTIFIER FOR PRODUCING ACTION THROUGH NETWORK

This application claims priority under 35 U.S.C. §120 from and is a continuation in part of copending International Application PCT/US98/20597, filed Sep. 30, 1998, with respect to all shared subject matter.

FIELD OF THE INVENTION

The present invention relates to a marking medium area that has markings encoding an identifier for producing action through a network.

BACKGROUND OF THE INVENTION

It is well known to link electronic documents by setting up hyperlinks between documents in HTML format stored at, and transferable between, computers forming nodes of a conventional computer network, e.g. the Internet or an intranet. See Berners-Lee, T. J., Cailliau, R., and Groff, J.-F., *The Worldwide Web, Computer Networks and ISDN Systems* 25, North-Holland, 1992, pp. 454–459.

Södergård, C., Juhola, H., Bäckström, C., and Vainikainen, I., "A Pen Scanner Based System For An Easy Access to Relevant WWW Hyperlinks", in *Proceedings of TAGA '97 Conference*, Quebec, Calif., May 4–7, 1997, Technical Association for Graphic Arts, 1997, describe a system in which a pen scanner enters printed anchor words linked to uniform resource locator (URL) addresses. The scanned text is processed with optical character recognition (OCR), and the OCR result is processed in an interpretation module to select a correct link anchor from a locally stored link list that has been downloaded from the publisher's World Wide Web (WWW) server. After selecting the link anchor, the corresponding URL addresses are determined from the link list and the WWW pages are retrieved with an Internet browser and displayed on a monitor.

Robinson, P., Sheppard, D., Watts, R., Harding, R., and Lay, S., "A framework for interacting with paper", *EURO-AGRPHICS '97*, Vol. 16, No. 3, 1997, pp. C-329 to C-334, describe a framework for preparation and presentation of mixed-media documents using a registry that associates physical locations on pieces of paper with actions. A DigitalDesk, which has a video camera mounted above a desk to detect where a user is pointing and to read documents on the desk and a projector mounted above the desk to project objects onto the work surface and paper documents, is used to identify pieces of paper and animate them by placing them on the DigitalDesk. The camera identifies the document and follows the pointer, and associated actions are identified in the registry and invoked as appropriate with the results being projected back onto the paper. To identify a document, a page is marked with a unique OCR font identifier that encodes the location of the directory as a network IP address and an index for the document within the directory. A document can be printed from the registry, with its unique identifier; a printed document's page representation is retained in the registry as an immutable copy of its structure. Paper access to the World Wide Web is possible. Given a URL, information on the associated web page can be captured in the registry, the page can be printed, and links can be activated by placing the paper on a DigitalDesk and pointing. The page's identifier and the coordinates of the link are looked up in the registry to yield the appropriate activity, and the results are projected back onto the desk.

Johnson, W., Jellinek, H., Klotz, L., Rao, R., and Card, S., "Bridging the Paper and Electronic Worlds: The Paper User Interface", *INTERCHI '93 Conference Proceedings*, ACM, 1993, pp. 507–512, describe techniques in which documents can contain, in addition to the human-readable information (e.g. text), printed machine-readable encoded data. The document can, for example, be a form and the encoded data can be a form identifier. A prototype system can receive a faxed form and decode the form identifier, locate an appropriate action description file, process the page image, and provide the information from the page image to the action procedure for the form. The system automatically creates a new form that points at a newly stored document, to give the user a way of accessing and interacting with it later, with checkboxes that allow the user to print or delete it.

U.S. Pat. No. 5,661,506 describes a pen and paper information recording system using an imaging pen. A writing paper has a writing surface and a prerecorded invisible pattern of pixels. Each pixel contains encoded, optically readable position information that identifies a coordinate position on the writing surface, and may also include a page number and a pad number. The system includes an imaging system for providing image signals representing images of pixels near the pen tip. A processor responds to the image signals and determines and electronically records positions of the pen tip on the writing surface as markings are made.

U.S. Pat. No. 5,486,686 describes machine readable electronic domain definitions of part or all of electronic domain descriptions of hardcopy documents and/or of part or all of the transforms that are performed to produce and reproduce such hardcopy documents, encoded in codes that are printed on the documents. The codes permit the electronic domain descriptions of the documents and/or the transforms to be recovered more robustly and reliably when the information carried by the documents is transformed from the hardcopy domain to the electronic domain. Encoded data embedded in the hardcopy document may include descriptions of the data points for structured graphics, descriptions of algorithms utilized for performing computations for spreadsheets, descriptions of hypertext pointer values, descriptions of structural characteristics of an electronic source document, descriptions of a document editor, descriptions of file name and storage location of an electronic source document, and descriptions of audit-trail data for an electronic source document.

SUMMARY OF THE INVENTION

The invention addresses problems in obtaining automatic actions through a network. It is often difficult to obtain an appropriate automatic action such as access to multimedia information or other information available through a network. This is especially true where the context includes a physical object such as a hardcopy document, and the action should be appropriate to the object.

The use of hyperlinks in electronic documents relies on conventional user interface techniques—keying in and/or point and click—with a networked computing device. Conventional user interface techniques require the user to divert attention away from the hardcopy document (e.g. a book) which he or she has been reading and require the user (a) to manually enter information (e.g. a WWW URL) needed to retrieve the related information and (b) it the user does not know beforehand and has not been informed in the hardcopy document where to access the related information, to perform some search in order to find the related information.

Conventional techniques that rely on encoded information on a document have heretofore been quite limited, typically providing only for a limited set of information of a limited type, such as printed documents, to be retrieved and viewed. Also, some such techniques require the user to stop reading the document, to mark it in an appropriate way, and then to feed it manually into a fax machine or scanner coupled to a networked computing device, in order for the desired function to be performed.

The techniques described by Södergåard et al. and Robinson et al. may lead to advances, but were developed with other objectives in mind and are not well-suited to efficiently obtaining an automatic action appropriate to a specific physical object. The Södergåard technique relies on OCR of any of a number of anchor words that appear in a book, and each anchor word is linked to a URL through a link list; but an anchor word appears to produce the same URL independent of the book in which it appears. The Robinson technique requires a complex sequence in which a Web page is retrieved, then printed, then pointed to on the DigitalDesk. In general, these and other conventional techniques do not provide automatic actions appropriate to physical objects through a network in a non-disruptive streamlined manner.

The invention provides techniques that alleviate these problems. The techniques employ action/medium identifiers encoded in machine-readable markings on marking media such as sheets or stickers of paper or documents. Each action/medium identifier identifies an action. The action/medium identifier can be used to obtain an action identifier that can be provided through a network to an action device to produce the action. The action device provides the identified action automatically in response to the action identifier. The action/medium identifier also identifies the marking medium. Because the action/medium identifier identifies both the marking medium and the appropriate automatic action, the marking medium can be used to obtain the appropriate automatic action in a non-disruptive streamlined manner. The user can obtain the automatic action in a way that does not disturb normal reading activity and does not disturb document appearance.

Some of the techniques provide articles of manufacture for obtaining automatic actions through a network using processing circuitry for connecting to the network and detection circuitry for providing input signals to the processing circuitry. An article can include an area of a marking medium and machine-readable markings within the area. The machine-readable markings can encode an action/medium identifier as described above. The machine-readable markings can be decodable to obtain the action/medium identifier by the processing circuitry using input signals that define machine-readable markings in the area of the marking medium.

The action/medium identifier can be implemented to include a globally unique identifier of the marking medium area, such as a globally unique page or sticker identifier. The detection device can be an image input device and the machine-readable markings can be invisible or can be visually nonobstructive markings.

If the area of the marking medium is a page, the action/medium identifier can include a page identifier, and the action device can include digital data defining a counterpart image of the page. The counterpart image can be isomorphic with the page. The action/medium identifier can also include a location identifier that identifies a location of a zone within the page, and the identified action can relate to the zone. The machine-readable markings that encode the page identifier can be in a different section of the zone than the markings that encode the location identifier. The zone can also include an orientation marking indicating orientation of the page.

If the area of the marking medium is part of a hardcopy document, the action/medium identifier can include a document identifier that identifies the hardcopy document. The action/medium identifier can also include the action identifier, though the machine-readable markings encoding the document identifier can be at a different position than the markings that encode the action identifier.

If the area of the marking medium is a sticker, the action/medium identifier can include a sticker identifier that identifies the sticker.

In each case, the action/medium identifier can also include an access control code derived from the medium identifier using a secret function, to prevent certain types of fraudulent uses of identifiers.

Other techniques provide methods of providing automatic actions through a network. A method can receive input signals from a detection device as described above. The method can use the input signals, decoding the machine-readable markings to obtain the action/medium identifier, can then use the action/medium identifier to obtain the action identifier, and can provide the action identifier through the network to the action device.

If the area of the marking medium is a page, the method can be implemented with an action device that includes digital data defining a counterpart image of the page as described above. Second input signals defining machine-readable markings in a second area, encoding a second action/medium identifier, can be received and decoded. The second action/medium identifier can identify the marking medium and a location within it. The second area can also include human-readable markings identifying a link to a network address, and the action identified by the second action/medium identifier can follow the link.

The method can also be implemented to provide the action/medium identifier to a machine, such as a global or network-wide router, to obtain network addresses. One network address can be that of the action device, the other that of a peripheral device that is also connected to the network. The method can use the action device's address to provide the action identifier and the peripheral device's address to the action device. The action device can respond by performing the action to obtain output data and can then use the peripheral device's address to provide the output data to the peripheral.

The method can also be implemented to determine whether the action identifier meets a valid request criterion before it provides the action. If the action identifier includes both a medium identifier and an access control code derived from the medium identifier using a secret code, the action device can determine whether the access control code was derived using the secret code.

Yet other techniques provide systems for providing automatic actions through a network. A system can include detection circuitry for providing input signals as described above, and processing circuitry for receiving input signals. The processing circuitry can use the input signals to decode the machine-readable markings to obtain the action/medium identifier, then use the action/medium identifier to obtain the action identifier. The processing circuitry can then provide the action identifier through the network to the action device, which provides the action automatically.

The system can be implemented with a pointer that includes the detection circuitry. The pointer can also include a user input device for providing user input signals, in response to which input signals are provided. The detection circuitry can be image input circuitry, the pointer can also include a marking element, and the processing circuitry can obtain, for a series of images, time data indicating the times at which the images occurred. The pointer can be a handheld device.

The techniques according to the invention are advantageous because they can be used to provide an automatic action appropriate to a physical object, such as a hardcopy document or an object to which a sticker is attached, in a non-disruptive streamlined manner.

In addition, the techniques according to the invention allow a rich variety of implementations. For example, in one implementation, the action/medium identifier can be encoded in invisible or visually nonobstructive machine-readable markings that are uniformly distributed on the marking medium; as a result, the detection circuitry can be in a pointer that can recover the action/medium identifier from any position on the page, and it is not necessary to provide the identifier in a text region, as would be the case for an action identifier that is a URL. Some implementations are advantageous because a handheld detection device can be used, increasing interactivity. In comparison with conventional techniques that rely on URLs, some implementations of the invention advantageously provide action/medium identifiers of sufficient density that they can identify any of an enormous number of actions and can allow worldwide or global access to remote information; URLs, on the other hand, require different words for different actions, which tends to limit the number of actions that can be addressed. Some implementations advantageously provide action/medium identifiers that can integrate in one encoded value a medium identifier, an action identifier, and an access control code. And some implementations allow a sheet of paper to act as a remote extension, analogous to an input peripheral, to a digital document repository, such as a collection of documents stored on a server connected to a network; the repository can be distributed as a result of the sheets acting as its extensions.

The techniques according to the invention could thus be implemented to provide worldwide hyperlinking of paper documents to electronic data, within a virtually unlimited address space, and in a way that produces little or no distortion of usual document appearances and minimal disturbance of normal reading activity.

The following description, the drawings, and the claims further set forth these and other aspects, objects, features, and advantages of the invention.

DETAILED DESCRIPTION

Figure 1:
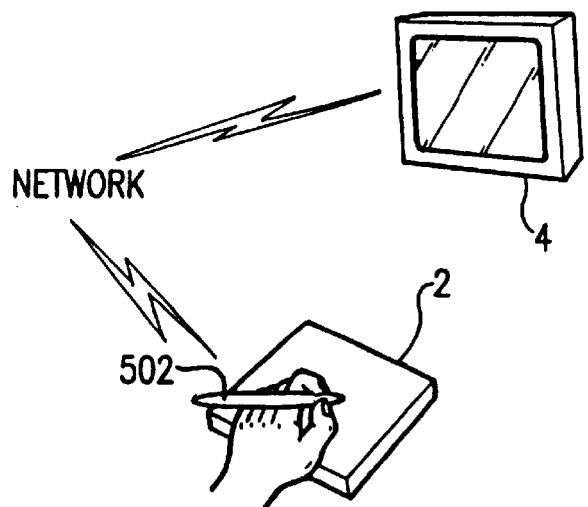
FIG. 1 illustrates schematically how a user may access electronic documents by interacting with hardcopy documents.

The following definitions are helpful in understanding the broad scope of the invention, and the terms defined below have the indicated meanings throughout this application, including the claims.

A "processor" or "processing circuitry" is a component that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations. A processor or processing circuitry may include one or more central processing units or other processing components.

A processor or processing circuitry performs an operation or a function "automatically" when it performs the operation or function independent of concurrent human intervention or control.

Any two components are "connected" when there is a combination of circuitry that can transfer signals from one of the components to the other. For example, two components are "connected" by any combination of connections between them that permits transfer of signals from one of the components to the other.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

A "network" is a combination of circuitry through which a connection for transfer of data can be established between machines. The circuitry in a network need not all be connected by transmissive elements such as wires—a network can include wireless links. Various types of machines can be connected to a network, and various terms can be used to refer to such machines; for example, the term "router" can be applied to a machine that responds to items of data by providing network addresses; the term "server" can be applied to a machine that responds to items of data by providing a service.

An "action that can be produced" through a network is any operation that can be produced by providing signals through the network. An "automatic action" is an action that is automatically produced in response to appropriate signals.

A processor "accesses" an item of data in memory by any operation that retrieves or modifies the item or information within the item, such as by reading or writing a location in memory that includes the item.

A processor or other component of circuitry "uses" an item of data in performing an operation when the result of the operation depends on the value of the item. For example, the operation could use the item to access another item of data.

An item of data "indicates" a thing, event, or characteristic when the item has a value that depends on the existence or occurrence of the thing, event, or characteristic or on a measure of the thing, event, or characteristic. An item of data "indicates" another value when the item's value is equal to or depends on the other value.

An item of data "identifies" or "is an identifier of" one of a set of identifiable items if the item of data is one of a set of items of data, each of which can be mapped to at most one of the identifiable items. For example, an "action/medium identifier" is an item of data with a value that can be mapped to at most one of a set of actions and one of a set of marking media.

An identifier is a "globally unique identifier" if it maps to at most one thing in the world. An identifier is a "network-wide identifier" if it maps to at most one entity available through a network.

A first identifier "includes" a second identifier if the second identifier can be obtained from the first identifier. For example, the second identifier may be the same as the first identifier, it may be a part of the first identifier, or it may obtainable by decoding the first identifier or using the first identifier to access a table or other data structure to obtain the second identifier.

The term "image" is used herein to mean a pattern of light, whether within or outside the visible range.

Signals "define" an image when the signals include sufficient information to produce the image. "Image input circuitry" is circuitry for obtaining data defining images as input.

A "marking medium" is a physical medium on which a pattern of marks can be produced, such as by marking or printing actions. Common examples of marking media include sheets of paper and plastic. Where a collection of pieces of marking media such as a set of sheets are attached or otherwise associated to form a unit, the entire collection can be referred to as a marking media. As used herein, "marking" or "mark" includes both visible and invisible marks, and includes a single mark and also plural marks that together form a pattern of marks.

Markings that encode items of data are "machine-readable" if techniques are available for automatically obtaining the items of data from signals that include information about the markings. Markings that encode items of data are "human-readable" if humans can perceive the markings and extract the items of data.

A marking or collection of markings, even if visible, is "visually nonobstructive" if it does not obstruct a human's visual perception of other visible markings printed in the same area of marking medium.

A "detection device" or "detection circuitry" is a component that detects markings and provides signals that include information about the markings.

A "physical page" or "page" is a marking medium that includes only one sheet; a card, a poster, and an ordinary sheet are all pages within this meaning. A "hardcopy document" or "document" is a collection of one or more pages, with at least one page including markings indicating information. A "sticker" is a page that can be made to adhere to a surface.

An "electronic document" is intended to cover not only electronically stored files which can be presented to the user visibly (e.g. via printing or electronic display of a page or document), but also to audio and audio-visual documents and any other records of information that can be stored and retrieved electronically, or computed or produced at will, and presented by appropriate means to the user.

A "digital page" is an electronic document that is a counterpart of a physical page. A digital page and a physical page can have one or more types of "isomorphism", meaning ways in which they have the same form. For example, it may be possible to recover the exact layout of the physical page from the digital page because the position of any mark on the physical page is indicated, implicitly or explicitly, in the digital page. Due to isomorphism, a position in the physical page, such as a position indicated by a pointer, can also have meaning in relation to the digital page.

Similarly, a "digital document" is an electronic document that is a counterpart of a hardcopy document, and the two may have isomorphism as described above.

An activity is performed "on" a marking medium when the activity is performed in close proximity to the marking medium and the activity refers to the marking medium. Examples would include making marks on the marking medium, scanning the marking medium, or pointing to a part of the marking medium.

A "valid request criterion" is a criterion that can be applied to determine whether a request for an action is valid.

1. Introductory Overview

1.1 Network Interactions

Figure 2:
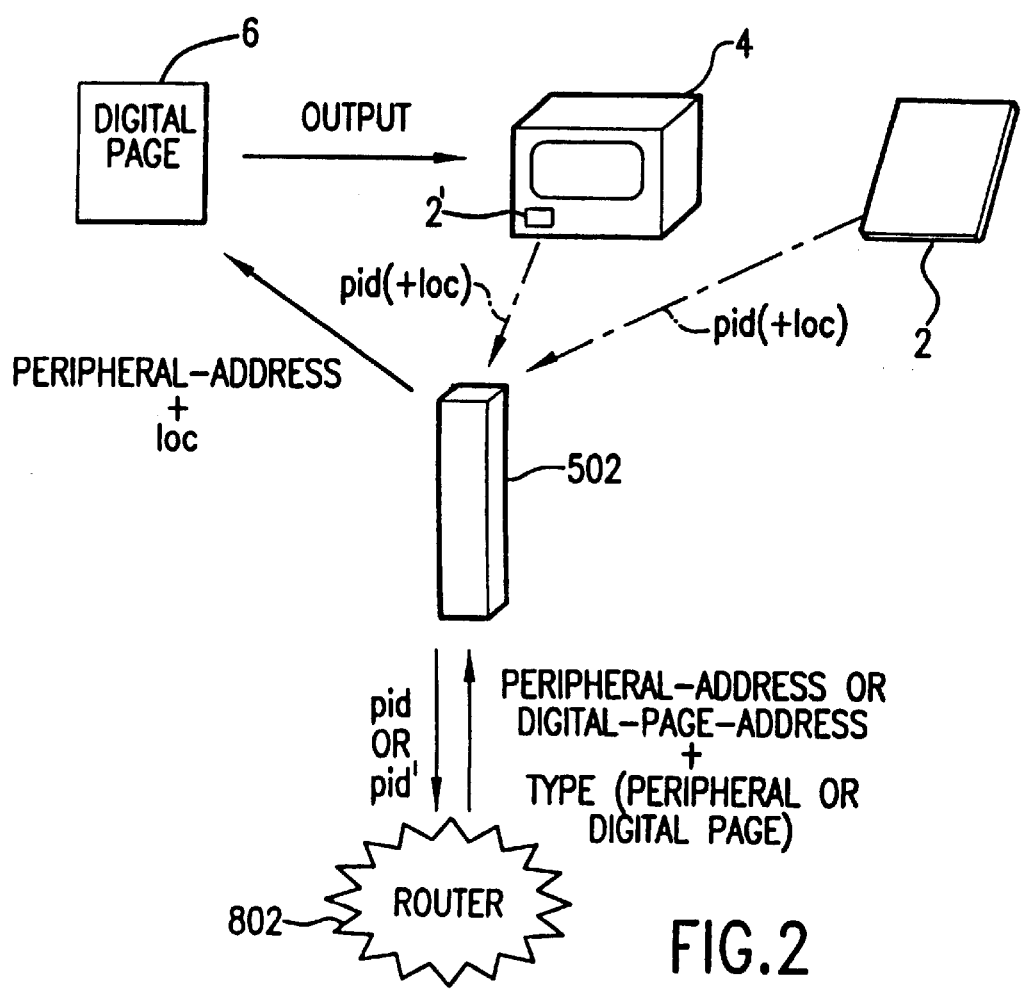
FIG. 2 shows schematically the routing of various data, including page identification codes and page location codes, over a network.

FIGS. 1 and 2 provide a useful introduction to network interactions available in some implementations of the invention.

FIG. 1 illustrates schematically a scenario in which a user may access electronic documents, and cause actions to be performed at a local or remote device connected to a network, by interacting with hardcopy documents.

The user may manipulate (e.g. position or move with a wiping action) a detection device, such as a camera in pointer 502, an implementation of which is described in detail below, to capture local images of portions of hardcopy document 2 and provide input signals defining the captured images. Data derived from the captured images, such as action/medium identifiers, can be provided to a network (e.g. via some local device (not shown) provided with network communications facilities). Several examples of action/medium identifiers are discussed in further detail below. Document 2 can be, or can be formed from, a special type of marking medium in which a substrate, such as a sheet or sticker of paper or a document, bears visible or invisible markings that encode an identifier of the substrate and, in some cases, can also encode locations or zones within the substrate, as discussed in further detail below with reference to FIGS. 3 to 7. The markings can, for example, be Xerox DataGlyphs. Such substrates are referred to herein as "coded substrates". In some of the examples described below, visible or invisible machine-readable markings encode a page identification code and, optionally, a page location code identifying a position of the markings relative to the page.

Using this scenario, an action can be performed through the network, such as presentation to the user via a local device or peripheral device such as display 4 of output from a digital page related to document 2, or operation upon information related to or present in document 2.

FIG. 2 shows schematically the routing of various items of data, including page identification codes and page location codes, over a network between several components connected to the network.

The user can click a button (not shown) on pointer 502, providing a signal similar to a mouse click, while the camera on the pointer is capturing an image of machine-readable markings either at a certain location on a physical page of document 2, or on a small sticker 2' on display 4. Sticker 2' can be formed from a coded substrate.

Processing circuitry receiving input signals from a camera in pointer 502 can decode the machine-readable markings to obtain two pieces of data—a page-identifier (pid) or sticker identifier (pid') and a location code (loc or loc') indicating localization on the page or sticker. These decoding actions are shown as dotted lines extending from document 2 and sticker 2' to pointer 502.

The page identifier pid (or sticker identifier pid'), with or without a location code, can be an example of an action/medium identifier. It can, for example, be a number that both identifies the page or sticker from which it is decoded and also identifies an action that can be produced through the network. In FIG. 2, the action is produced by using the pid (or pid') to obtain a network address, and by then providing the loc as an action identifier. The network address can be obtained by sending the pid (or pid') to router 802, whose network address can be stored by pointer 502 or associated circuitry. Router 802 can use the pid (or pid') to obtain and return two pieces of information—a network address and a type which can illustratively be either "peripheral" for pid' or "digital-page" for pid. The association of pid (or pid') with its address and type can then be kept by pointer 502 or associated circuitry in a cache for possible future use.

When the type is "peripheral", router 802 provides the network address of an associated peripheral device, such as the network address of display 4. Pointer 502 or associated circuitry can save the network address of display 4 in a peripheral-address store. In the implementation shown in FIG. 2, the location code loc' is not used when the type is "peripheral".

When the type is "digital-page", router 802 provides the network address of digital page 6, which can be a digital page counterpart of document 2 that is stored on a server connected to the network. Pointer 502 or associated circuitry can (1) save the network address of digital page 6 in a digital-page-address store, and (2) send location code loc, serving as an action identifier, and the network address of display 4 from the peripheral-address store to the digital page's network address.

The above technique is discussed further below with reference to FIG. 12.

Digital page 6 may be a digital representation (e.g. a Web page) of the printed, human-readable information in document 2, a representation that can be displayed or printed. Digital page 6 may alternatively be a digital representation of some other document or information related to, or derivable from, document 2.

When digital page 6, which can be located on a conventional Web server or other server or machine on the network (not shown), receives data from the pointer 502, an executable on the server on which the digital page resides can first be executed to decode the location code loc and to perform the action it identifies. The action typically produces output, and the same or another executable on the server on which the digital page resides can be executed to send the output to the peripheral address. The digital page can then wait to receive another loc and another peripheral address. The manner in which the digital page responds to action identifiers is discussed further below with reference to FIG. 13.

1.2 Further Network Considerations 1.2.1 Routing

Addresses can be interpreted globally (similar to Internet addresses) or interpreted pre-emptively by a local computer.

The process of using or interpreting an action/medium identifier to obtain a network address is referred to herein as "routing".

Global or network-wide routing can be provided by an entity producing coded substrates ("coded substrate supplier"). The coded substrate supplier can associate a default Web page, at some centralized site, with each page-identifier it produces. The buyer of a coded substrate page ipso facto becomes the owner of the centralized Web page associated with the page-identifier of the coded substrate page. The buyer may have only limited rights to use this page, due to memory usage considerations; for instance, the buyer may have only the right to store in it the net address of his own Web page, which can contain a digital page or other detailed data relating to information printed on the page. The centralized Web page provided by coded substrate supplier can act only as a go-between between the page-identifier and its associated digital page, and the machine on which the centralized Web page resides therefore acts as a router. With this approach, from anywhere in the world, the page-identifier can be routed to its corresponding centralized Web page and thence to its digital page through a generic routing scheme.

This approach could, of course, be optimized in ways that do not require, for example, the owner of an address book living in Paris to route each page identifier first through the headquarters of the coded substrate supplier in Palo Alto then back to his home computer in Paris.

Routing could also be improved by caching a network path associated with a page-identifier for access efficiency.

Various routing techniques that may be employed are described in greater detail in copending, coassigned U.S. patent application Ser. No. 09/276,084, entitled "Using Identifiers to Obtain Network Addresses, incorporated herein by reference.

1.2.2 Wireleess Communication, Ubiquitous Peripherals

Other functions that the communication infrastructure may provide include:

allowing pointer 502 or associated circuitry to send a page-identifier to a predefined address router, which is able to determine the Internet address of the digital page corresponding to this page-identifier, receiving (and possibly caching for future use) a digital page's Internet address, sending an encrypted code or other code indicating access rights to the digital page's Internet address, sending location codes to the digital page's Internet address, sending to the digital page's Internet address the Internet address (or phone number, etc.) of a peripheral to which output should be sent, and sending to the peripheral the output produced by a process associated with the digital page in response to a location code.

2. Encoding Action/Medium Identifiers

A wide variety of techniques could be used to encode and decode action/medium identifiers into and from machine-readable markings.

Current or shortly available printing technology, conservatively estimated, permits to print on the order of 1000 bits of reliable information per square centimeter. For example, DataGlyph™ technology developed by Xerox Corporation already permits encoding on the order of 500 bits/cm², including a robust error correction scheme, assuming printing and scanning at 400 dpi. Considering the special constraints placed on DataGlyph™, which are required to be visually nonobstructive to humans, constraints that would not be necessary for invisible marks, and also keeping in mind that the production of coded substrate will be a process carried out by specialized machines, it seems reasonable to assume 1000 bits/cm² is achievable.

Each 0.5 cm by 0.5 cm square zone or cell of machine-readable markings can hold, for example, 256 bits of reliable information. Of these, 128 bits can hold the page-identifier (which is thus redundantly repeated on each cell of a page), and 16 bits can hold the cell localization (or cell address or location code) on the page. 16 bit location codes correspond to a maximum number of 65536 cells on a page, which in turn corresponds to a 123 cm×123 cm maximum size page. 112 bits are left for other information, such as a page-id-code that can be used for authentication or data private to the publisher.

Detection circuitry could be in a pointer that has the shape of a pen, as illustrated by pointer 502 in FIG. 1. When the pointer's tip is positioned anywhere in a given cell, the detection circuitry can, for example, provide input signals defining an image showing the whole cell. By decoding machine-readable markings in the image to obtain the cell address, processing circuitry in or associated with the pointer can obtain the position of the cell on the page. By detecting the cell border, the processing circuitry can also determine the precise position of the pointer inside the cell. Thus the processing circuitry can localize the pointer precisely relative to the whole page. The processing circuitry can also decode the page-identifier and the page-id-code and can then provde these two items of data, along with a location code, on the network for interpretation via external components.

Various other techniques could be employed for encoding and decoding action/medium identifiers.

2.1 Machine-Readable Markings

A coded substrate supplier could use various techniques to produce machine-readable markings such as those described above. The coded substrate could, for example, include invisible markings on paper, which could be nonetheless be detected by the detection circuitry in a pointer device.

For example, ultra-violet (UV) ink could be used to print invisible markings on white paper. Such an ink is transparent to the human eye, yet an area of paper covered by it reflect UV light differently from an uncovered area. A coded substrate supplier could produce sheets of paper in different formats for different uses by the publishing industry. Each sheet can be processed through a specialized printing procedure which (1) assigns a fresh page-identifier (and possibly page-id-code) to the sheet, and (2) prints in UV ink machine-readable markings encoding the page-identifier (and possibly page-id-code) on the surface of the sheet.

A publisher can buy these apparently uniformly white sheets and can print visible markings on them using standard ink.

An end user can position a pointer device with detection circuitry on a printed page of the coded substrate. A radiation source on the pointer can emit UV light or the UV component of natural light can be used. The detection circuitry can detect the reflected UV light from the UV-ink layer. This light, apart from being invisible to the human eye, is similar to conventional visible light and standard techniques for optical scanning can be applied to obtain an input signal defining the UV light image.

In certain cases it may be necessary to use different inks to avoid problems, such as conventional ink layers blocking transmission of UV light. However, in standard trichromatic printing, three layers of coloured inks (yellow, magenta, and cyan) are superposed to produce all visible colours. Each layer filters one part of the light spectrum independently of the others. That is, to a reasonable approximation, the magenta layer does not block light that would be absorbed by the cyan and yellow layers, etc. Therefore, for most trichromatic printing, UV light should not be blocked.

Alternatives to UV ink include infrared ink, phosphorescent ink, or some type of magnetic ink, which has been proposed in the past for bar-code type scanning. It may also be possible to provide machine-readable markings from which an input signal can be obtained by non-optical means. It is beneficial, however, if the machine-readable markings are durable, do not interfere with visible printed marks, and permit recovery of page-identifiers, page-id-codes, and location codes.

Other alternatives include visible inks printed in visually nonobstructive patterns, such as DataGlyphs, which can provide robust encoding and decoding of data at a relatively high density.

Figure 3:
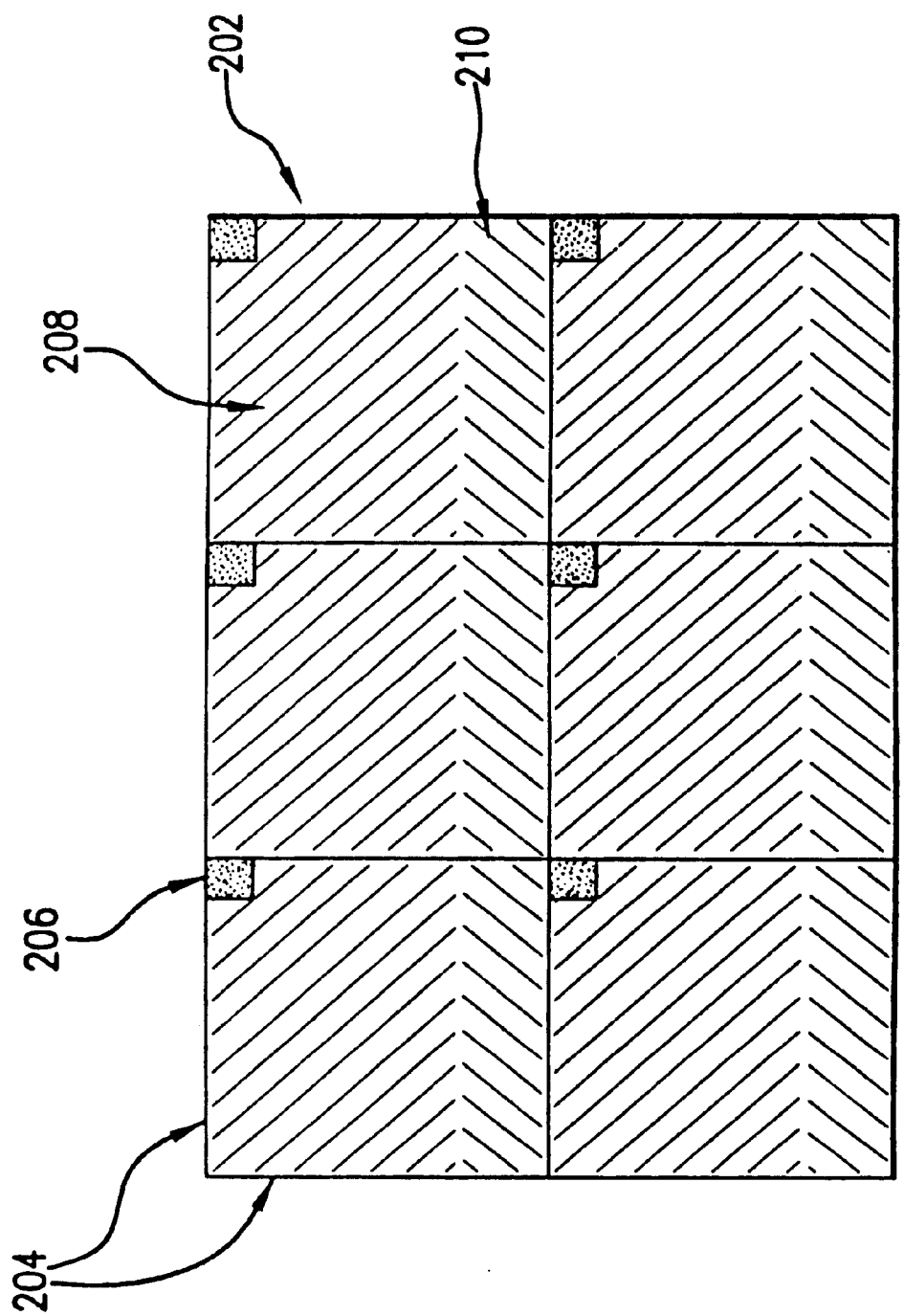
FIG. 3 shows schematically a sample of zones, and a disposition of machine-readable markings, on a coded substrate.

FIG. 3 illustrates a sample of zones or cells, and the disposition of machine-readable markings, on an coded substrate. FIG. 3 shows that each zone or cell 202 can include markings as follows:

cell border 204, which must be distinguishable from cell contents, and which surrounds the interior of cell 202;

some indication of the orientation of the page, such as orientation marker 206, which can be within the interior of cell 202;

an encoded representation of a page-identifier, i.e. an item of data whose value uniquely identifies the page, within cell border 204, such as a first set of markings 208; and an encoded representation of location information, such as a location code uniquely defining the position of cell 202 within the page, within cell border 204, such as a second set of markings 210, illustratively smaller in size than first set 208.

Each zone or cell 202 thus includes border 204 and orientation marker 206. A first set of markings 208 over part of the interior of cell 202 provides an encoded representation of a page-identifier, while a second set of markings 210 over a smaller part of the interior of cell 202 provides an encoded representation of a location code (page-loc)—uniquely defining the position of cell 202 within the page. The orientation of the page is given by mark 206 in one corner of cell 202, making it asymmetric in both dimensions. The cells can be tiled to cover the entire page.

In FIG. 3, the page-identifier and location code are shown schematically; detail is given in FIG. 5, discussed below.

Figure 4:
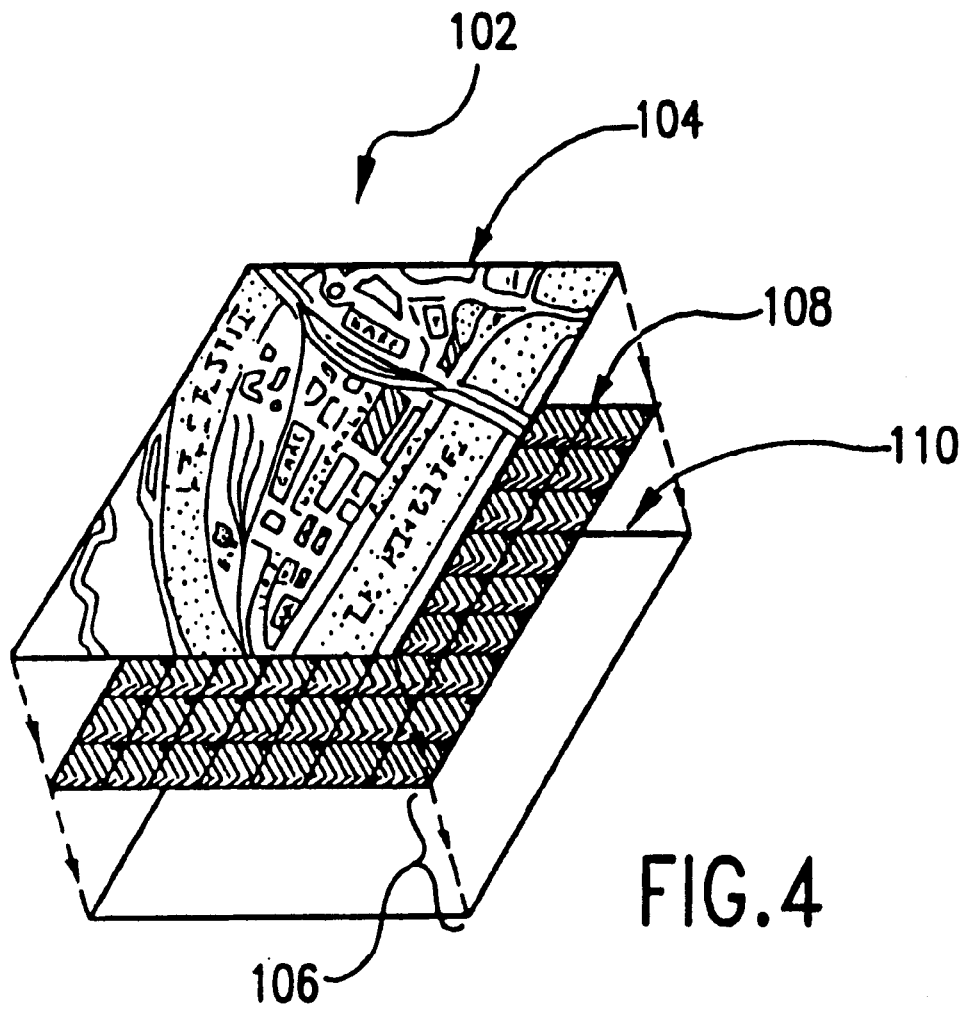
FIG. 4 illustrates components of a document printed on a coded substrate.

FIG. 4 illustrates components of a document printed on a coded substrate. Printed document 102 comprises layer 104 of printed visible (human-readable) information, i.e. document content, printed on coded substrate 106, illustratively a segment of a map though layer 104 could include text, photographic images, or any other human-readable information. The coded substrate 106 in turn comprises a layer 108 of visible or invisible machine-readable marking sprinted on a sheet medium 110 (e.g. paper).

Figure 5A:
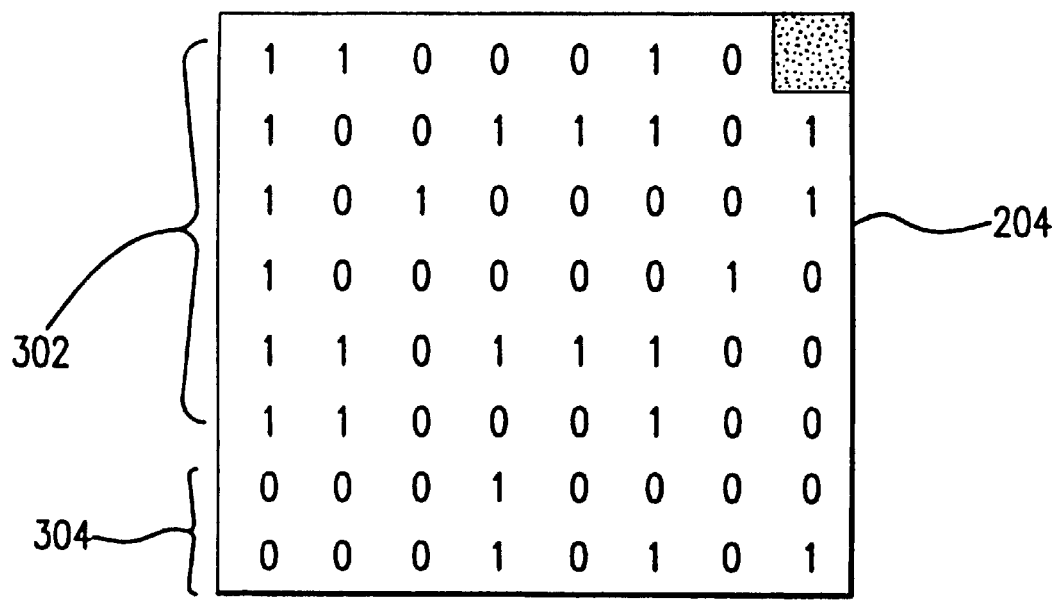
FIGS. 5A and 5B show how digital data can be encoded in markings printed in a zone of the type illustrated in FIG. 4.
Figure 5B:
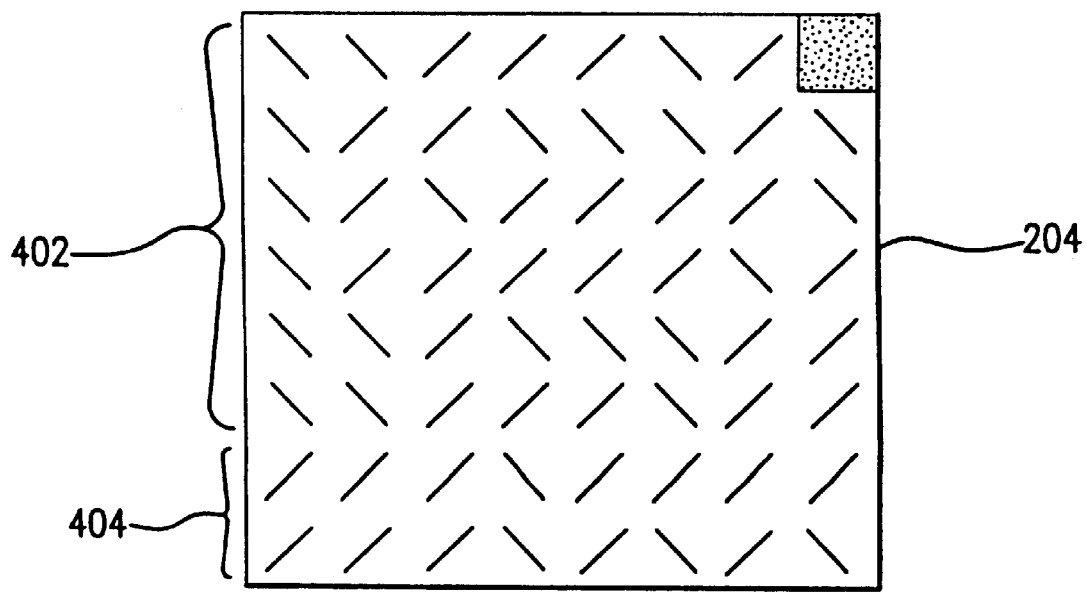

FIGS. 5A and 5B show how digital data can be encoded in a single zone or cell like those illustrated in FIG. 2. FIG. 5A shows the unencoded binary data with each binary value or bit in approximately the position of its encoded representation, i.e. 47 bits of page-identifier in upper section 302 (the bit stream wraps at cell border 204), and 16 bits of page localization data (loc) in the lower section 304. The page-identifier code denotes 108429159095492 (decimal)= 629DA182DCC4 (hexadecimal)= 110001010011101101000011000001011011100011000100 0001000000010101 (binary, to make the wrapping explicit). Within the border of a cell, the page-id is represented as an ordinal number, in binary (FIG. 5A). The cell can be 8 by 8 symbols (or bits) wide, with one symbol's worth of space taken up by the orientation mark. In the 16 bit loc code in section 304, there are 8 bits for the X coordinate and 8 bits for the Y coordinate. Thus, for the cell (zone) shown, its position is 16,21 on the substrate. Localization identifies a cell (zone) on the page, not a point on the page.

With this encoding, a complete cell must be within the region of the page from whose image a page-identifier and location code are to be obtained. Less than a complete cell does not contain sufficient information.

The addition of error correction information is desirable. This can be done with standard techniques and is not shown; the actual encoding after the addition of error correction information will be different from what is shown, and will require more bits (and thus more space).

The number of possible pages and the number of possible cells on a page are a function of the density of the encoding. Using the encoding shown, $2^{47}$ pages can be identified, with up to 64 by 64 cells on each.

FIG. 5B shows the same data as in FIG. 5A, but represented by DataGlyph markings. Encoding using DataGlyphs and the retrieval of data therefrom is discussed further in U.S. Pat. No. 5,486,68, and EP-A-469864, both incorporated herein by reference. Here, a first set of glyphs (markings) in upper section 402 encodes a page-identifier and a second set in lower section 404 encodes a location code (loc). Each glyph encodes the bit at approximately the same position in FIG. 5A, so that each glyph extending from upper left to lower right encodes a "1" and each glyph extending from lower left to upper right encodes a "0". DataGlyphs offer advantages in robust decoding.

A page-identifier, location codes, and any other data can be encoded on the coded substrate in any other suitable manner. For example, the encoding may be as described in any of: U.S. Pat. Nos. 4,786,940; 5,245,165; 5,278,400; 5,315,098; 5,449,895; 5,521,372; 5,537,223 5,572,010 and 5,576,532.

The inks used to encode data may be visible or invisible, and may be detected by visible optical, IR, UV, magnetic, or any other suitable means. For example, suitable inks for the machine-readable markings may be as described in any of U.S. Pat. Nos. 5,075,186; 5,225,900; 5,301,044; 5,145,518; 5,046,087; 5,275,647; 5,208,630; 5,202,265; 5,271,764; 5,256,193; 5,286,286; 5,331,140; and 5,291,243.

Figure 6A:
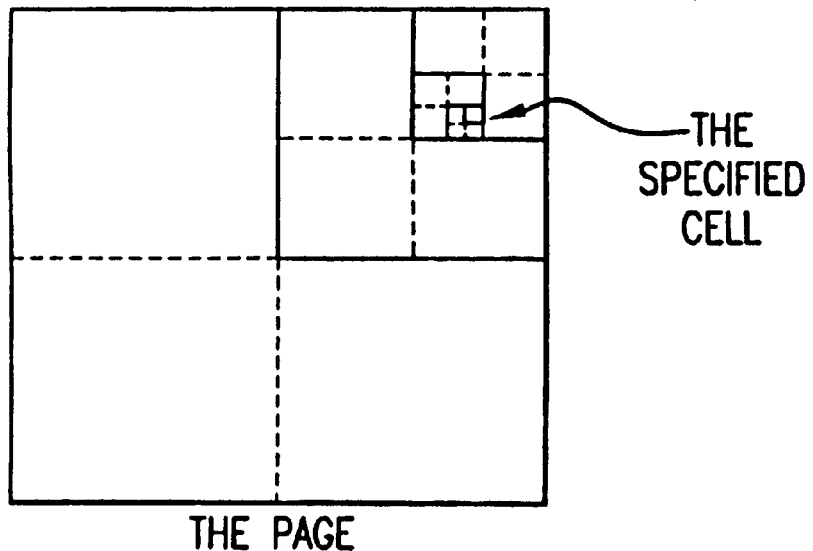
FIG. 6A shows schematically another disposition of zones or cells on a page and FIG. 6B shows schematically an exemplary zone or cell on the page.
Figure 6B:
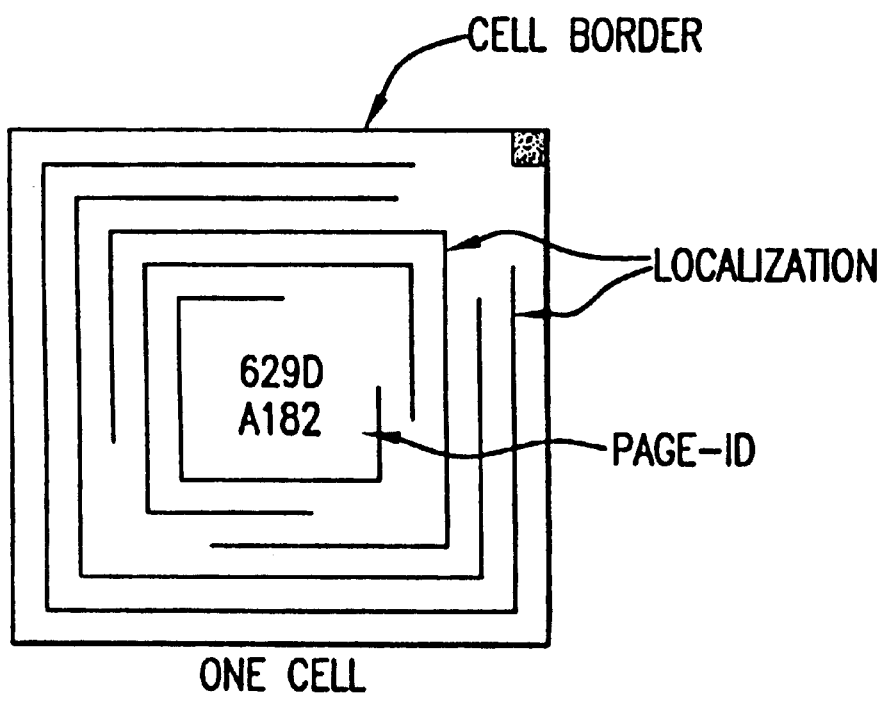

FIG. 6A shows a disposition of zones on a page, suggesting how a location code could be based on successive divisions of regions of the page into quadrants rather than on X and Y coordinates as described above. FIG. 6B shows an exemplary zone or cell, with a page-identifier encoded in the center of the cell in alphanumeric characters and with a location code encoded by a sequence of embedded concentric localization markings, each of which is a quasi-square with a corner missing, the orientation of the missing corner of each localization marking thus indicating one of four values corresponding to the four quadrants illustrated in FIG. 6A; by starting with the outermost localization marking in FIG. 6B, and by taking the indicated quadrant, the specified cell in FIG. 6A is reached.

Figure 7:
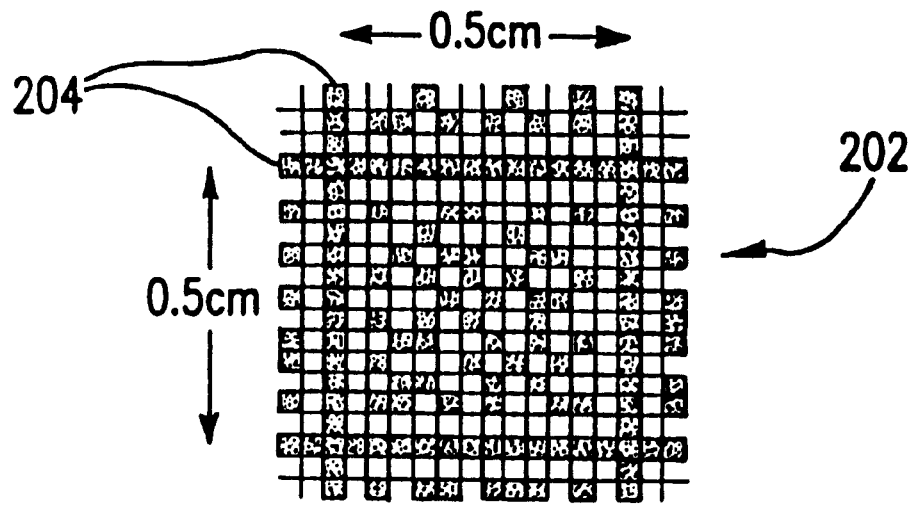
FIG. 7 illustrates another exemplary zone in which machine-readable markings encode data.

FIG. 7 illustrates another exemplary zone in which machine-readable markings encode information. Here, a paper page is divided into 0.5 cm×0.5 cm square cells. Each such cell can contain on the order of 256 bits of information. The illustrated cell 202 is identifiable by its distinctive border 204, consisting of uninterrupted horizontal and vertical lines of black pixels. A square of pixels, which is separated from the black border by a white area one pixel wide, holds the encoded information, illustratively 10 pixels×10 pixels, but in reality it could have a higher resolution.

Machine-readable markings could encode information in various other ways. For example, rather than encoding a page identifier with location codes over a large region of a page as suggested above, encoded location identifiers could occupy relatively small regions and could be positioned only in certain active positions or regions of the page, such as rectangular regions around words or icons printed on the page. This implementation is referred to herein as a "non-positional implementation".

The encoded location identifiers in a non-positional implementation could, for example, be DataGlyph address space fragments of the type described in copending, coassigned U.S. Pat. No. 5,937,110, entitled "Parallel Propagating Embedded Binary Sequences for Characterizing Objects in N-Dimensional Address Space", incorporated herein by reference. Other markings could be used, such as bar codes, icons, circled numbers in an OCR font, and so forth. The robustness of the non-positional implementation increases with the ease of recognition of the markings, while the document looks better as the intrusiveness of the marks decreases, and particularly as the marks remain recognizable when partially occluded, metrics on which DataGlyphs perform well.

If a page or document includes no more than 1000 active positions or regions, 10 encoded bits would be sufficient to uniquely identify each active position or region. If printed in visible ink, the machine-readable markings could provide a visual cue reminding the user that a position or region is active, even though the markings are visually nonobstructive.

For a multipage document, a non-positional implementation could also provide a unique document identifier that is encoded in machine-readable markings on each page of the document, making a page-identifier unnecessary. The document identifier could be encoded in each active position or region together with the position identifier, or it could be encoded separately in markings that could be at the bottom of the page. Alternatively, the document identifier could be encoded only once, such as on a cover page of the document.

3. Detection and Processing

As mentioned above, a detection device or detection circuitry can provide input signals that include information defining the machine-readable markings, and processing circuitry can use the input signals to obtain an action/medium identifier. The detection device or circuitry and the processing circuitry could take any appropriate form. Some examples are illustrated in FIGS. 8–11. Other examples of detection devices that could be used are described in copending, consigned U.S. patent application Ser. No. 09/144,250, entitled "Methods and Apparatus for Camera Pen"; Ser. No. 09/144,251, entitled "Glyph Address Carpet Methods and Apparatus for Providing Location Information in a Multidimensional Address Space"; and Ser. No. 09/223,882, entitled "Multi-level Selection Methods and Apparatus Using Context Identification for Embedded Data Graphical User Interfaces", all incorporated herein by reference.

FIGS. 8–11, the detection device is included in a pen-shaped pointer, that can be provided with a clicker or other user input device. The pointer could include a small transparent screen, rimmed with a code-reading device, with a cross hair in the middle; this may be a less costly implementation in the near term than a pen-shaped pointer, and it can encompass more of the surface of a page at one time thus allowing for more accurate recovery of position and/or the possibility of recovering the position with fewer coded areas on the page.

Figure 8:
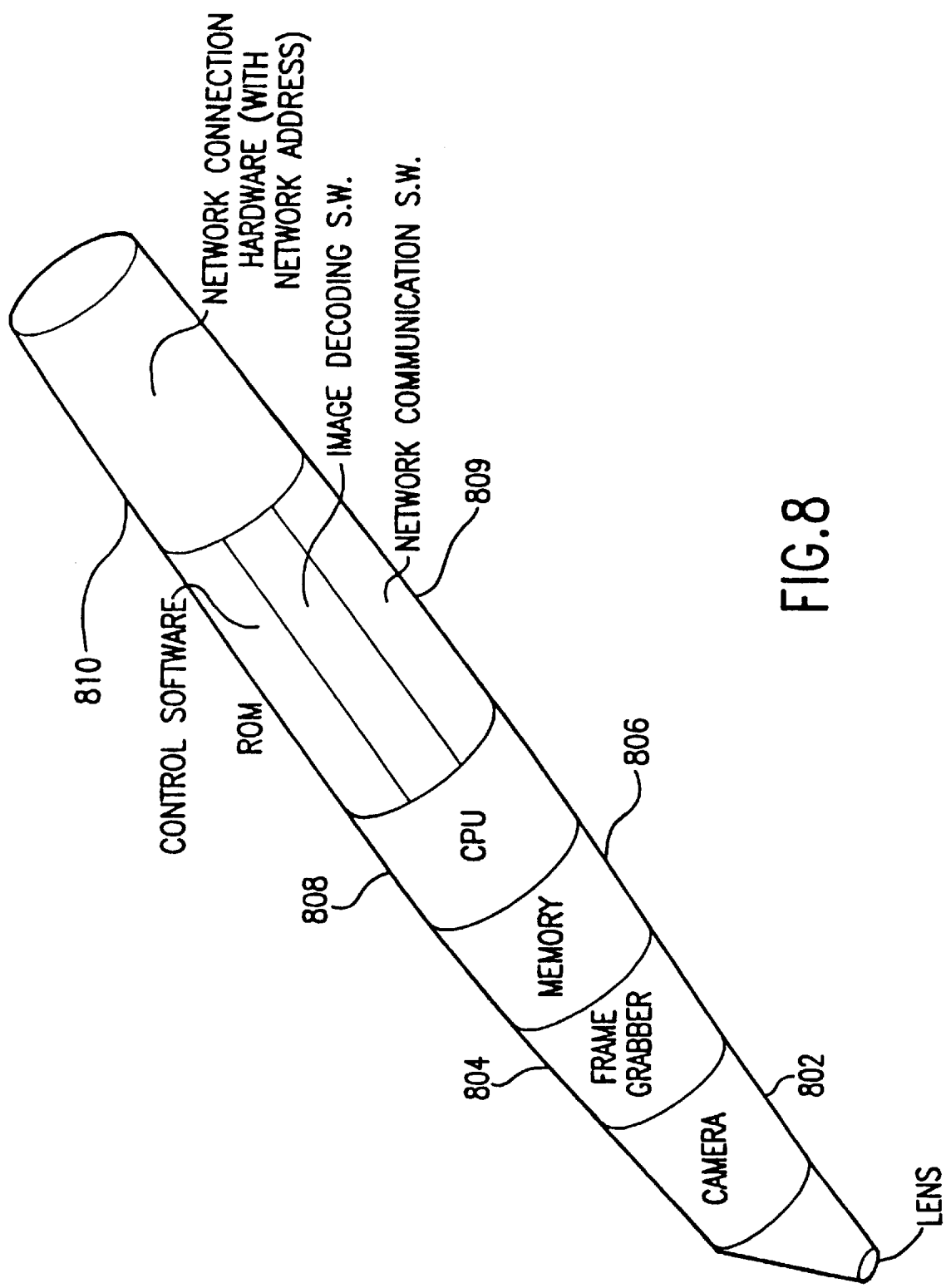
FIG. 8 is a schematic illustration of internal components of a detection device or pointer.

FIG. 8 is a schematic illustration of internal components of an image input device that is part of a pointer. The pointer is a complex object that may be a single physical device or may be several communicating devices. It can include:

1. A hand-held image-reading device, including a clicker or button;
2. An image-decoding device; and
3. A network communication device.

The image-reading device receives light and produces image data. When the user clicks the button, the image data is made available to the image-decoding device. The image-decoding device decodes the image, producing a <pid, loc> pair which can be used by the network communication device as illustrated in FIG. 12.

FIG. 8 shows schematically a special purpose pointer. The illustrated pointer includes camera 802, frame grabber 804, memory 806, central processing unit (CPU) 808, a button (not shown, but can be similar to a conventional mouse button) for the user to click on a region of a page to activate frame grabber 804, memory 809 which includes read-only memory (ROM) storing image decoding software, network communication software, and control software, and network connection hardware 810. The functions of these components could be provided by any appropriate combination of software hardware. Memory 809 can also include registers or other appropriate storage for a digital-page network address, an output-peripheral network address, and a cache comprising a set of triples <pid, type, address>, where "type" distinguishes the pid of a digital page from that of a peripheral.

The image-reading device can be implemented as a pen-camera or hand-held scanner, typically including CCD elements with hardware to turn optical input into image data.

The pointer can also be implemented as a collection of devices that communicate with each other rather than as a single device. The most obvious separation points are mentioned in 1, 2, and 3 above, though 1 and 2 could be in the same physical device, or 2 and 3.

The image-decoding device may also be implemented as a general purpose computer containing a frame grabber board and an image decoding software package. Likewise the network communication device can be implemented as a general purpose computer with a network connection or as a network computer.

The function of frame grabber 804 is to capture a snapshot in memory from the image data that camera 802 continuously produces. If camera 802 is not integrated with or tethered to the image-decoding device, both devices must have wireless communication facilities to allow camera 802 to transit image data to frame grabber 804. There are performance considerations in such an implementation, because the amount of image data necessary to define an image is large. The button click also must be communicated, as it resides on camera 802 for ergonomic reasons, but activates frame grabber 804.

The snapshot can be input to the image-decoding device, whose output can be a <pid, lock> pair. If the image-decoding device is not integrated with the network communication device, the <pid, loc> pair can be transmitted to the network communication device. Again, each device can have communication facilities, such as a cord, or some form of wireless communication such as infra-red, or mobile telephony.

Figure 9:
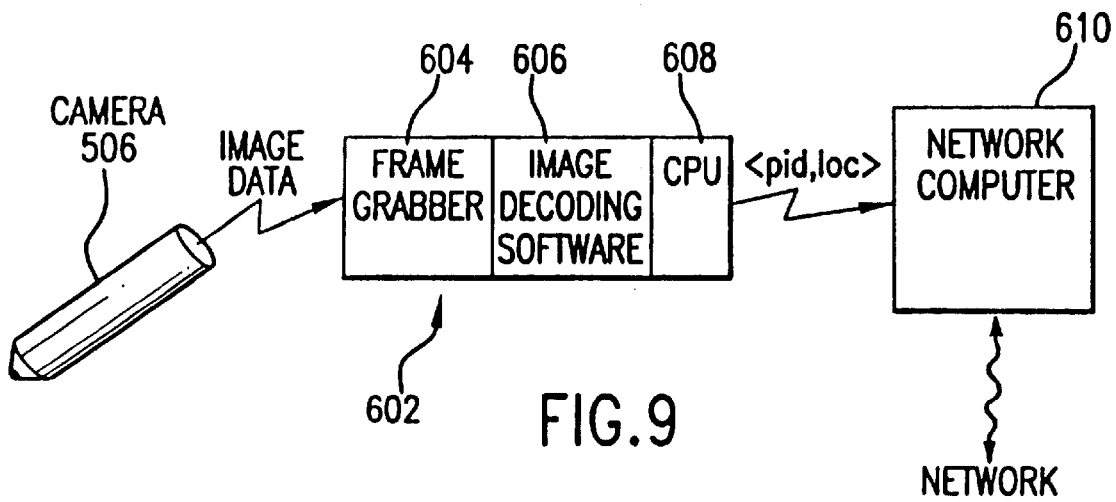
FIG. 9 shows schematically a configuration for passing page identification codes and/or page location codes from a pointer as in FIG. 8 to a network computer.

An alternate implementation of a pointer is shown in FIG. 9. FIG. 9 shows a configuration for passing page identification codes and/or page location codes from image input circuitry as in pointer 502 in FIG. 1 to processing circuitry that includes a network computer. Image capture device 506, illustratively a CCD or other appropriate camera, is coupled by wired or wireless (e.g. IR or RF) link to processing device 602 and in use provides image data defining capture images to processing device 602. Image capture device 506 and processing device 602 may be combined into a single handheld unit or may be separate components.

The operative elements of processing device 602 include frame grabber circuit 604, image decoding software 606, and CPU 608, which are known in the art. CPU 608 can execute image decoding software 606 and other conventional software to receive and decode an image from frame grabber circuit 604 and to provide decoded data to other components as described below. Processing device 602 can also include memory, accessible by CPU 608 for storage and retrieval of data.

In use, processing device 602 extracts from the image data the encoded page-identifier and page-location data to obtain an item of data (<pid, loc>) and communicates the item of data in a wired or wireless fashion to a local device illustratively network computer 610 linked to a network such as an intranet or the Internet in a known manner. Computer 610 can have its own unique network address, but need not have any information output device like a display screen or printer, because such a device is not necessary to perform the function of providing a connection between CPU 608 and the network. Processing device 602 and computer 610 could therefore both be within pointer 502, and could communicate and share resources through any appropriate circuitry. Computer 610 could, however, perform other functions, in which case it could have a user interface appropriate for those functions.

Network computer 610 can have a cache and digital-page network address and output-peripheral network address storage. As network computer 610 need not have a screen, it need not be large.

Figure 10:
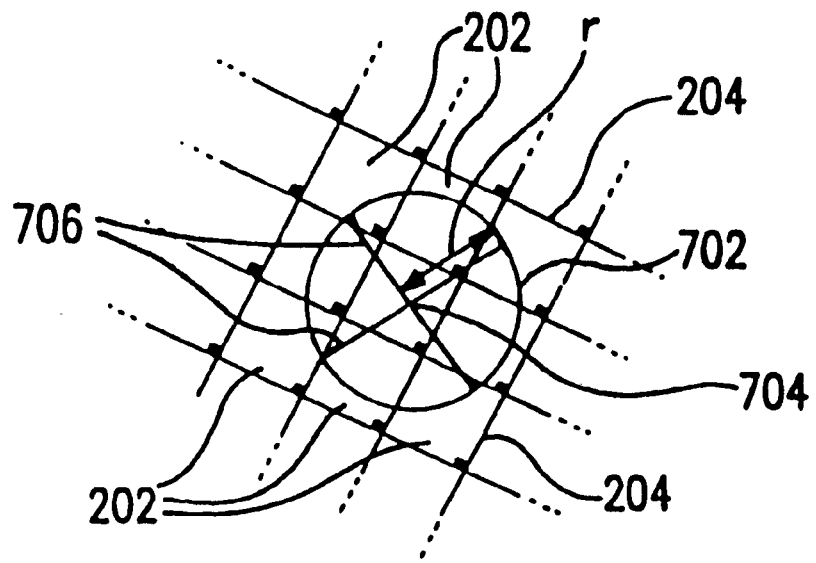
FIG. 10 illustrates schematically an image containing coded zones that could be captured using an image input device or pointer as in FIG. 8.

FIG. 10 illustrates the capture of an image containing coded zones 202 using an image input device such as a camera in a pointer. FIG. 10 shows a small region of a page, with field of view of the camera (not shown) delimited by circle 702. The radius r of the camera's field of view must be larger than the diagonal of cells 202 in order that the field of view contain at least one cell 202. The center 704 of the camera's field of view (shown as the intersection of crosshairs 706) will lie in exactly one cell, or, if it lies on cell border 204, one of the adjacent cells is chosen by convention as the cell that contains center 704.

The location of center 704 relative to cell borders 204 identifies a location within a cell 202, which in combination with the orientation and the identification of cell 202 identifies the location on the page.

Figure 11:
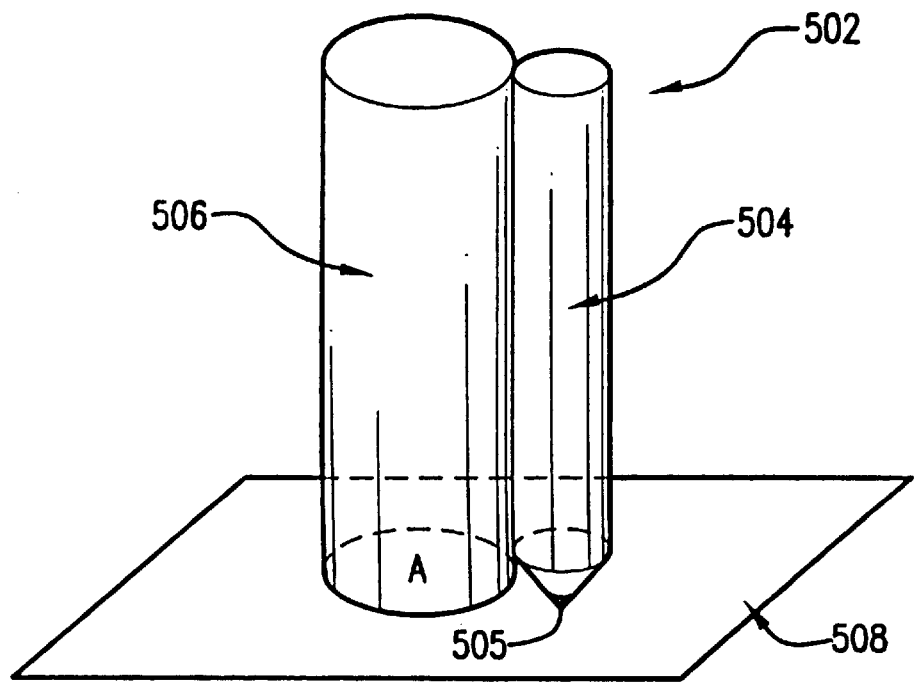
FIG. 11 schematically illustrates features of an image input device or pointer.

FIG. 11 schematically illustrates features of a pointer that may be used in implementing the invention. Pointer 502 comprises pointing device 504, which may have tip 505, and image capture device 506, which can be a camera or another type of image input circuitry. In use, image capture device 506 is able to capture images of an area A of a document 508, which can be implemented with a coded substrate as illustrated in FIGS. 3–7. For the sake of illustration, the sizes of the components of pointer 502 are exaggerated, and pointing device 504 is shown parallel to image capture device 506 although they could be differently oriented—e.g. in practice, area A may be much closer to tip 505 of pointing device 504 than appears in FIG. 11, so that a user may easily determine from tip 505 where area A is located. In certain embodiments, pointing device 504 may be omitted. In others, pointing device 504 may also be a pen or any other marking device suitable for making marks on a coded substrate that are visible to a user. If pointing device 504 is a marking device, it functions as a combination writer-pointer. Image capture device 506 can monitor the position of tip 505 in real time, and marks can be recorded in digital form concurrently with their physical production. This allows capture of handwritten notes. If pointer movements are timestamped, the dynamicity of the strokes can be recovered to preserve the time and order of each annotation and its relations to other events, such as events in a video recording; related techniques are described in copending, coassigned U.S. patent application Ser. No. 09276,532, entitled "Obtaining and Using Data Associating Annotating Activities With Portions of Recordings", incorporated herein by reference. The dynamicity of the strokes can also be used in signature authentication and handwriting recognition. Editor's marks handwritten on a draft typescript can be interpreted in real time to produce a corrected version. If the pointer is wireless, notes can be available online, allowing applications such as the transmission of handwritten taxes without a fax machine nearby.

The document 508 may be a 'blank' coded substrate, or such a substrate having human-readable information printed thereon.

A pointer as described above can have additional memory storing a unique pointer identifier, which the pointer can transmit along with an action/medium identifier such as a <pid, loc> pair. The pointer identifier can also be used to identify the pointer user. This technique makes it possible to provide a newspaper or magazine clipping service: When a user clicks on an article with the pointer, a hardcopy of the article is delivered to the user. The newspaper or magazine need not be tailored to the user in any way, but a subscribing user can provide a pointer identifier and a fax number. Then, when the user clicks or clips an article, the pointer identifier is looked up by the server in a table it maintains to obtain the fax number, which is used to fax the selected article.

A pointer as described above can also have additional programmable memory whose contents it transmits along with an action/medium identifier such as a <lid, loc> pair, for use in relation to a digital page. In this case, the user need not subscribe to the clipping service, or provide identification in advance. The programmable memory can include a fax number and a credit card number or other payment authorization code. When the user clicks or clips an article, these items are also transmited, so that the user pays for clippings as he or she goes.

These techniques make it possible to tailor services to the user of the document, so that two users, performing the same actions with the same document, may obtain different results. Services can thus be tailored for ease of use, without a separate action to transmit one's fax number or to pay.

4. Producing Actions

Input signals that include information identifying machine-readable markings could be processed in a variety of ways to obtain action/medium identifier, to use an action/medium identifier to obtain an action identifier, and to provide the action identifier on a network to produce the identified action. FIGS. 12 and 13 illustrate one way these operations could be performed.

Figure 12:
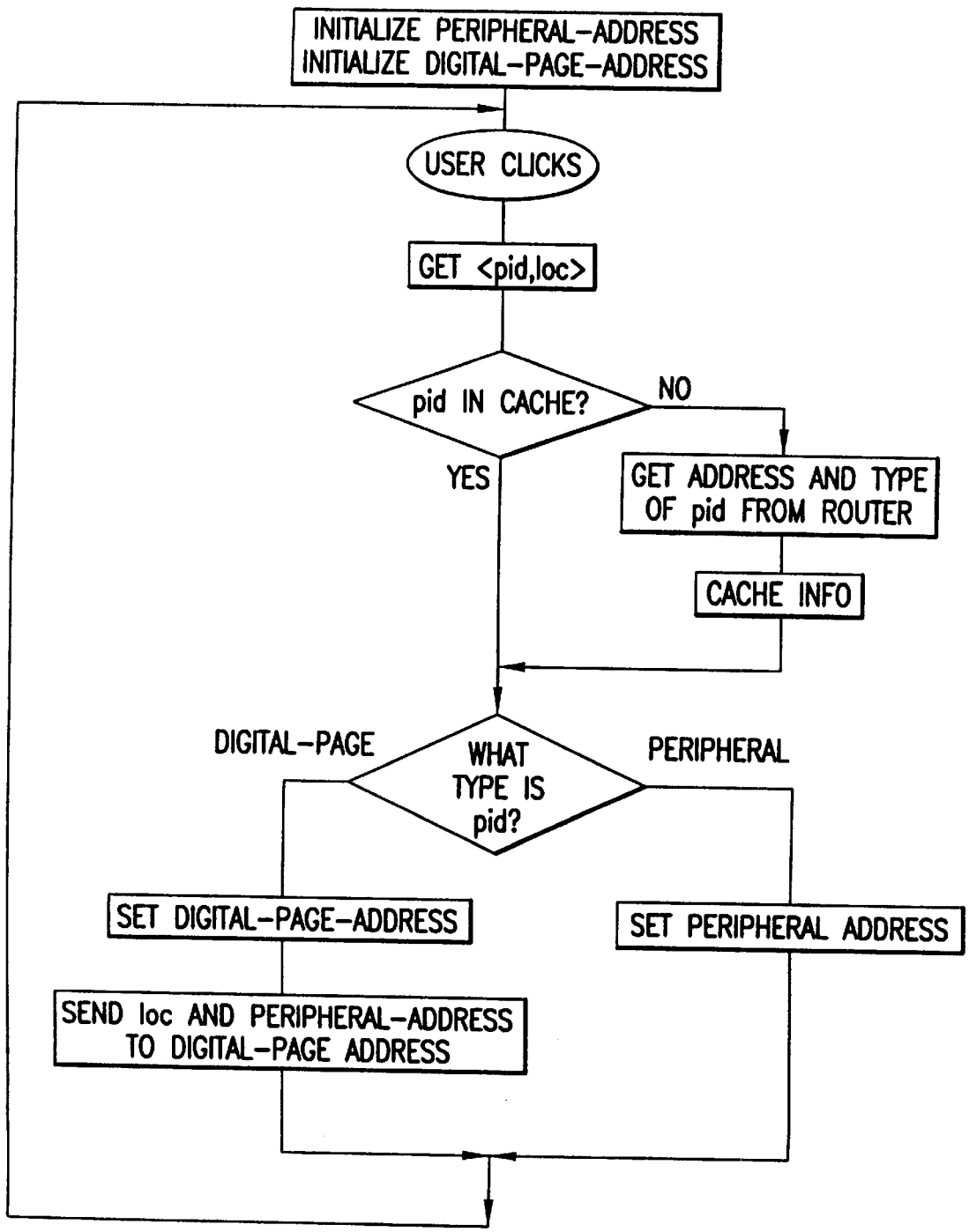
FIG. 12 is a flow chart showing acts that can be performed in using identifiers to obtain network addresses.
Figure 13:
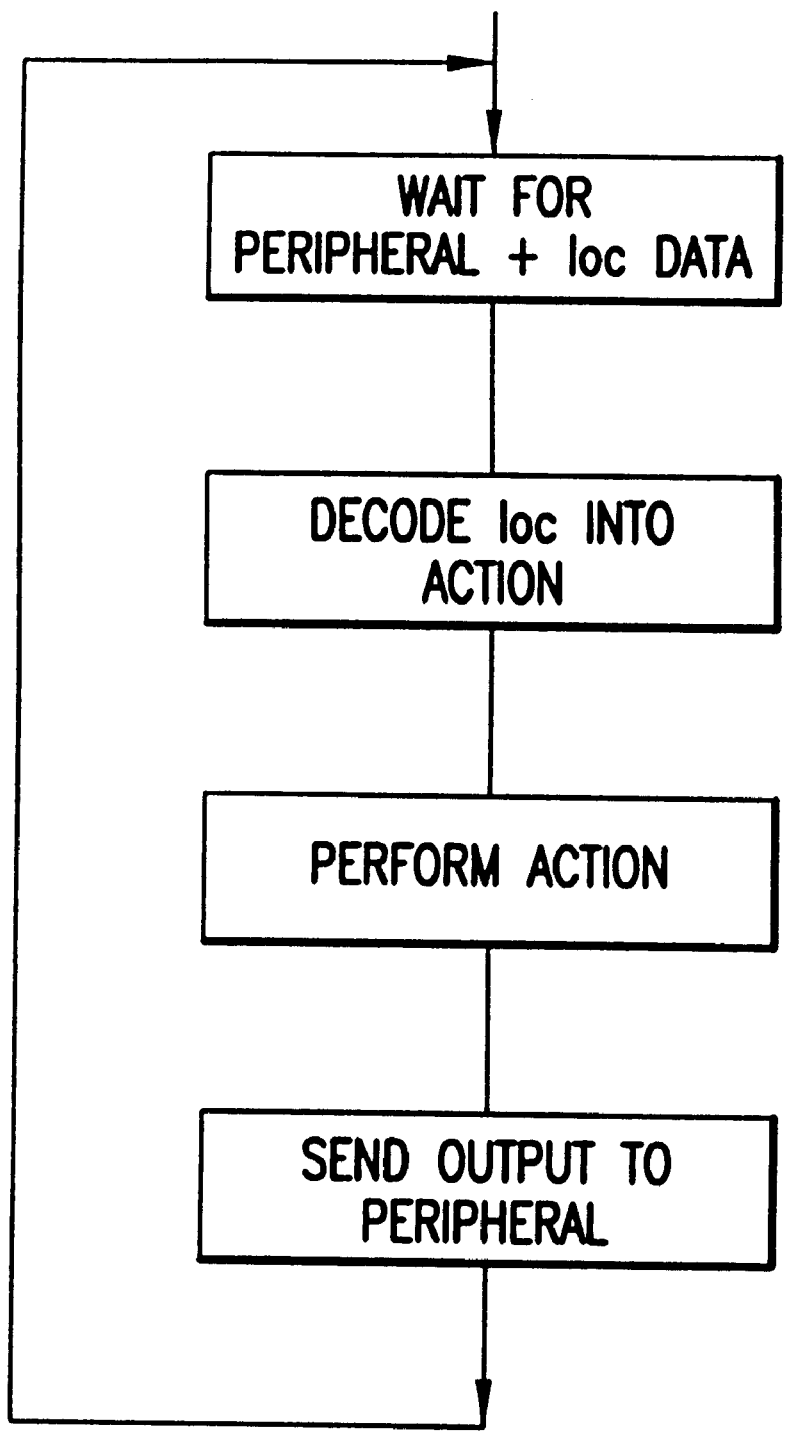
FIG. 13 is a flow chart showing acts that can be performed in providing an action in response to identifiers.

FIG. 12 is a flow chart illustrating acts that can be performed by processing circuitry, such as by CPU 608 or network computer 610 in FIG. 9 or by CPU 808 in FIG. 8.

In the first box in FIG. 12, the processing circuitry initializes memory locations at which it can store two network addresses, an address for a peripheral device to which output can be sent and an address of a digital page. As illustrated, the processing circuitry then performs a series of iterations, each of which begins when a user clicks.

In the second box, the user clicks, providing a signal that causes an image signal that includes information about machine-readable markings to be received. In the third box, the processing circuitry uses the image signal to obtain a decoded action/medium identifier in the form of a <pid, loc> pair. In the fourth box, the processing circuitry determines whether the pid can be mapped to a network address using cached data from previous operations. If not, the processing circuitry provides the pid to a router in the fifth box and the router provides a network address and a type in response. In the sixth box, the processing circuitry stores the pid in its cache, together with the network address and type from the router.

In the seventh box, the processing circuitry branches based on the type received from the router or retrieved from cache. If the type is peripheral the processing circuitry follows the right branch in FIG. 12, and sets its peripheral address to the network address received from the router or retrieved from cache. If the type is digital page, the processing circuitry follows the left branch, first setting its digital page address to the network address and then sending the peripheral address and loc to the digital page address.

FIG. 13 is a flow chart of acts that can be performed by an action device at which a digital electronic document such as a digital page is stored. As illustrated, the action device performs a series of iterations, each of which begins with the action device waiting to receive a peripheral address and a loc from the network, as shown in the first box.

When a peripheral address and a loc are received, the action device decodes the loc to obtain data indicating an action to be performed. The decoded data may, for example, be a handle for calling an executable to perform the action. The decoded data may include a file identifier for a digital page and an application for opening the digital page, such as Microsoft Word or PowerPoint. Then, the action device performs the action, obtaining output. In the fourth box, the action device provides the output to the peripheral address through the network, and the device at the peripheral address can display or otherwise respond to the output.

The acts in FIGS. 12 and 13 could be modified slightly for a non-positional implementation. Rather than providing a single click as in FIG. 12, the user can first click to provide an image signal including information about the document identifier at the bottom of a page or on a cover page, and then can click again to provide an image signal from one of the active regions with an action identifier, that is, a number identifying the region relative to the document. The processing circuitry can use the image signals to obtain a <doc, act > pair with the two identifiers. The processing circuitry can provide the doc to the router to obtain a digital document's network address, and can then provide the peripheral address and the act to the digital document's address through the network. The action device can respond much the same as in FIG. 13, using the act rather than loc to obtain data indicating an action to be performed.

As noted above, a non-positional implementation could alternatively encode the document identifier with the action identifier at each active position or region. If the action identifiers of different documents are in distinct ranges or sets of values, no further encoding is necessary because the action identifiers implicitly encode document identifiers. If a document identifier is encoded, implicitly or explicitly, with the action identifier at an active position or region, a single click could be used as shown in FIG. 12 to provide an image signal including information about both identifiers.

5. Other Implementations 5.1 Different Networks

The above description is quite general, and could be implemented with various communication protocols and infrastructures, such as infrastructures including conventional wired or wireless communication between pointers, peripherals, and computers.

Other implementations may couple coded substrates and peripherals in other ways. For example:

Shakespeare's play Othello, or any other such work, could be published as a book/CD/pointer/sotware package for use on a local network with a computer containing a CD player. If the CD player can interact with a monitor, the same work could be published as a book/CD/pointer package, where the software to control the CD player is built into the pointer. Signals from the pointer can be provided to the computer through the local network.

The pointer can contain a wireless telephone, and a coded substrate sales catalogue could allow a user to place an order by clicking on an item. The catalogue provider's phone number could be encoded in the substrate along with the page-id and pointer location information. Clicking on an item then initiates a call to the encoded number through a wireless network. The page-identifier and pointer location can be transmitted to the catalogue provider. These items of data can be used to identify both the item and the customer, allowing an order to be placed.

5.2 Other Devices, Marking Media, and Communications 5.2.1 Detection Devices

A variety of implementations could employ different detection devices. Examples include:

A detection device with a sensitive transparent screen overlaid on a coded substrate. A flexible, transparent screen made of plastic, rubber, or etc., could have, in one or more of its corners, a flat coded substrate code reading device. When the screen is touched with a finger, the screen is able to determine the location of the finger relative to the screen. Such a screen can for instance serve as a universal keyboard: It could be laid over a coded substrate on which a keyboard has been drawn. The user can types at a certain location on the screen, and the screen can determine what the location is, not only relative to its own coordinates, but also, because of the information read at the corners, relative to the intrinsic paper coordinates. The infrastructure can then determine that this is the location of letter A, for example. An action identifier could be obtained and used to obtain an action as described above, such as presentation of the letter A on a display.

Such transparent screens could be more practical than a pointer when several fingers act in parallel, as when typing on a keyboard. Some paper-based musical instruments could be implemented on this principle, with the actions being the generation of sounds.

Technology may become available to provide a transparent screen with a display capacity. In this case, an action could be to overlay the printed marks on physical paper, seen by the transparent sheet, with dynamically displayed graphics, in a way sensitive to the location of the screen on the page.

Another type of detection device could allow fingers to touch the paper directly, while finger locations are recorded through a pressure sensitive clipboard or the like positioned under the paper, rather than over it.

Another type of detection device which would not require either a screen or a clipboard could be a glove with a finger tip holding a small image input device.

Other types of detection devices that provide printing capability are a bi-directional writer-pointer and a hand-held stamper-like printing machine.

The writer-pointer illustrated in FIG. 11 could be modified to provide a bi-directional writer-pointer which receives external commands to deliver or not to deliver ink depending on its current position relative to the paper sheet. The user can cover an area by quick forward and backward moves of the pen; the positions at which ink has been deposited approximate a piece of graphics sent by the external site; in this way a limited local printing capability can be simulated.

Another way to obtain a local printing capability is through a small handheld printing device, resembling a stamper. The user can place the device over areas of the paper sheet; for each such placement, the stamper is able to determine its precise position relative to the sheet coordinates, and it can also determine which parts of the area still remain to be covered by marks. By repeated rough placements of the device by the user, a piece of graphics can be printed with high precision at a specific location on the paper sheet.

Another detection device is a hand-held precision scanner-pen.

The precise localization capability rendered possible by a coded substrate can be exploited for scanning purposes. Suppose the user has produced some drawing or note in the margin of a coded substrate. A small pen-like device can be provided both with a localization capability and with a scanning capability. By moving this device over the area of interest, if necessary through repeated moves, the user can perform a precise digitization of the whole drawing; this can be done even if the device has a small footstep (active scanning surface), because the images scanned during several moves will be easy to connect into a global picture.

The action in this case might include a process that pastes each scanned image in a page frame, positioned consistently with the location code. This technique would allow quick and accurate production over a network of a complete digital image of a region scanned in several independent wiping actions.

5.2.2 Marking Media

The above implementations employ marking media such as pages and documents, but a variety of other marking media could be employed. An example is:

Small round stickers, referred to as "confetti", could be made from a coded substrate. In particular, each sticker can have a unique sticker identifier. The stickers can be used to add multimedia links to a piece of conventional paper. The user can buy a few coded confetti. When perusing a conventional document, printed on standard paper, if the user wants to associate a certain action with a certain location on a given page of the document, such as to go to a certain Web site, to ring a certain phone number, to print a certain address on an envelope, the user can stick the confetti (which could be coloured or transparent) at the location of interest and associate, through his personal computer, or through a service provided by the confetti provider, the action with the confetti's sticker identifier.

Coded confetti can also be seen as a transition technology that permits one to confer upon conventional documents some of the advantages of coded substrate documents. Obviously confetti could be stuck on any support, not only printed material. A confetti stuck to a machine part could have the effect of showing a description of this piece on a screen, when pointed to.

Coded confetti could also be used to establish links between network connected objects, such as peripheral devices. The user could stick a confetti to a peripheral, and the associated action of the sticker identifier could be to establish the peripheral as the current peripheral to which output is transmitted. The action could also include transmitting information about the peripheral's characteristics to permit another action at the digital page to be performed or optimized as appropriate to the peripheral.

5.2.3 Communications

A variety of communication techniques could be implemented using the above techniques, including the following:

Communication could be provided between documents. Although there may be cases where every desirable capability of a coded substrate document is provided by its publisher independently of the existence of other coded substrate documents, this may not always be true. Communication can be established among coded substrate documents produced by different publishers, increasing overall document functionality.

Interdocument communication could be provided by using the pointer to send its own identifier with every transmission, and the pointers identifier could be used to establish communication. For example, the pointer identifier could be associated with a service that allows an application to store or retrieve data, so that one application providing a document could store data and another application providing another document could retrieve the data. The pointer identifier could include the network address of the service, or a router could use the pointer identifier to obtain the network address. The router could be dedicated to pointer identifiers or could handle them in the same address space as page identifiers.

Alternatively, the service could allow digital pages to register their own addresses, possibly with information about what sort of communication they can establish, and to retrieve such information registered by another digital page. For example, a digital page could register a remote procedure call which, when called, would establish a particular kind of communication, for retrieval and use by another digital page in making a call to the procedure.

Interdocument communication could be provided by extending the pointer to incorporate an internal communication service as described above. The pointer identifier in this case would be the pointer's Internet address, and routing would be unnecessary.

Interdocument communication could also be provided by extending the pointer to include a mode in which page identifiers are treated as data upon the user's request. A second button or the like could be clicked to have a page identifier stored in the pointer as data and transmitted on the next regular click along with the location code for the next regular click to the digital page associated with the page of the next regular click. The digital page could use the page identifier from the first click to establish a connection such as a socket between two digital page applications. In this case, the digital pages are in more of a master/slave relationship, because one receives the other's address. Also, the user must specify which clicks are treated in which way.

The value of interdocument communication can be understood from two examples.

Computerless email: Ariane wants to send a message to her friend Irene. She writes the message, using a writer-pointer as in FIG. 11, on NotePaper, a pad of coded substrates designed for sending notes. She then looks up Irene in her address book, itself a coded substrate document. She clicks the pointer on a Fax icon in Irene's listing in the address book. She then clicks on a Send icon on the sheet of NotePaper containing the message. The NotePaper application sends the image of that sheet of NotePaper to the address book application, which locates Irene's fax number in its database, and faxes the message to Irene.

In another context, Ariane could write another message on a sheet of NotePaper, and an image of the message could be recorded and stored on NotePaper's digital page based on signal from the writer-pointer. When Ariane clicks on the Print icon on a page in her address book, that page's digital page process receives the pointer identifier, resolves it to a network address of the pointer's registry service, and sends information sufficient to establish a socket connection with the address book page's digital page process and a request for taxable data. When she then clicks on the Send icon on the NotePaper, the NotePaper's digital page process receives the pointer identifier, resolves it to a network address of the registry service, and retrieves the information sent to the registry by the address book process, then establishing the socket connection and transmitting the stored image of the message. The address book process receives the image and sends it to the fax number associated with the Fax icon's active region. Or the Send icon could be pressed before the Fax icon, and the NotePaper digital page process could send the image to a data storage location associated with the pointer identifier, after which the Fax icon would cause the address book process to retrieve the image and fax it.

The registry or storage could be in the pointer, making it unnecessary to resolve the pointer identifier to a network address.

In another context, Ariane could write her message and store it as above, then click anywhere on the page using the second button. The page identifier of NotePaper is obtained and stored in the pointer. Ariane then clicks on the Fax icon of the address book page, and the page identifier of NotePaper as well as the location of the Fax icon in the address book are provided to the address book process. The action associated with the Fax icon receives the page identifier and uses it to establish a socket connection with NotePaper's digital page process. The socket connection can then be used to request the image, which the NotePaper digital page provides and the address book faxes as above.

These examples show how any data associated with a coded substrate can be sent to any peripheral addressable by another coded substrate. Specifically, a handwritten message can be sent to someone's fax machine or computer without the sender interacting with a fax machine or computer.

Comprehension Aid: Ariane is at home reading an English novel in a coded substrate edition that does not provide translation. She decides to get a French gloss of a difficult paragraph. From her wallet she takes a utility card with a number of application icons, and clicks on English->French Glosser. She then clicks on a Send Region on the inside of the back cover of her novel, and subsequently on the beginning and end of the difficult paragraph. The novel's application sends the paragraph to the glosser application, which displays the paragraph with a French gloss on Ariane's television screen.

6. Additional Functionalities

6.1 Basics

A digital page can be viewed as an object comprising functions and data that is constructed as the active counterpart to a physical page. As such, it implements any actions initiated by the user interaction with the physical page. The term "digital page process" refers to an executing instance of a digital page.

6.1.1 Communication between the Physical Page and the Digital Page

The user can interact with a coded substrate page by positioning the pointer on the page and clicking a button on the pointer. The pointer recovers its position relative to the page frame.

The coded substrate communication infrastructure, described elsewhere, delivers the position and the clicking events from the pointer to the digital page, delivers output from the digit page to a peripheral whose address has been specified, and delivers mode-switching commands from the digital page to the pointer. Communication between the physical page and digital page is limited to these kinds of information.

A digital page could do arbitrary computation with arbitrary data. Although a digital page's capabilities are not restricted, there are certain capabilities that make sense for a digital page, that will be useful across a wide range of coded substrate documents, and for which support can be provided in a generic manner, several of these are described here.

To reiterate, a digital page receives positions (x, y coordinates) and produces output (which may take the form of instructions to run a program on another machine, and input data for that program). The coordinates could be delivered to the digital page in any appropriate way, and the output could similarly be delivered to the machine on which it is to be displayed or executed in any appropriate way, as described elsewhere.

A basic coded substrate capability is to initiate an action by clicking in an active region on the page. Each active region is typically graphically marked, as with icons, labelled boxes, or highlighted words. Active regions have two elements: regions and actions.

6.1.2 Regions

A digital page receives the position of the pointer, and must determine if that position is within an active region. To this end, it can have a description of the active regions on the page.

Rectangular regions have a particularly simple description. Given two diagonally opposing corners of a rectangle, a digital page can determine whether a given point lies within it or not, and the function used to tell is also particularly simple.

Arbitrarily complex regions can be described in such a manner that a digital page can determine whether a given point lies within it. The function needed to decide may be complex, and different types of descriptions require different functions. We will call a pair consisting of a description of a region and a function to decide whether a point lies in it a "region".

6.1.3 Actions

Once the digital page has determined that a position is within an active region, it can cause an action (or a number of actions) to be executed. For this purpose, it can have a description of the action(s) for that region. Possible ways to describe actions include (but aren't limited to) programs (or functions), with or without input, pointers to programs (internal or external to the digital page), with or without input, and (type, data) pairs, where the type element identifies a conventional action to take, and the data element is input (e.g., URL, http://www.xerox.com could mean "open the web page http://www.xerox.com in a browser").

6.1.4 Action Tables

An action table is a table of (region, action) pairs, where the action element of the pair may describe a sequence of actions. A digital page can have at least one action table, describing active regions on the page. At any time, one action table can be active, which is to say that positions delivered to the digital page will be looked up in that table.

6.1.5 The Output Player

A coded substrate-based action (one arising through some user interaction with a coded substrate document using a pointer) often results in output on a machine near the user, while the digital page resides at some arbitrary location on the network. This is why the output of a digital page may be input to a program to be run on another machine. It happens that, in the above examples, Ariane's local peripheral is her TV screen. In this case, output takes the form of a video signal sent to her TV. But if her peripheral were a computer, the output would need to be of a different form, and in fact, of a different form for each different computer platform. The digital page should not be encumbered with the details of the form of the output. Each peripheral can be equipped with an output 'player', so called because it knows how to play various types of data; sound data is played on the audio system, video is played with a video player, text is displayed in a conventional way on the screen. Current browsers provide such capabilities in a platform-independent way for computers. The peripheral can run an output player directly or the peripheral can be controlled by a computer that runs an output player that sends output of the right form to the peripheral.

An output player receives typed data. Video, audio, and text are types that have already been mentioned; others could include control information (volume, colour, and so forth), spreadsheet position and value, etc.

In addition to giving the digital page platform independence, the output player solves the problem of how to push information and actions to another machine. A program on one machine does not routinely have permission to display data or execute a program on another machine. In the case of coded substrates, the peripheral near the user can be registered with the communication infrastructure. Either as part of the registration process or explicitly by the user at the point of interacting with a coded substrate document, an output player is launched on the peripheral. The digital page can send data to the output player, whose address is known to it by virtue of the registration; it need not launch a program on the peripheral. The output player, in contrast, can launch programs on the peripheral, subject to local permissions. An interesting kind of audio output would be to a mobile telephone to which the pointer is connected. For instance a tourist guide printed on a coded substrate could be used to send audio output to the user on his mobile phone giving him information about theater programs, etc.

6.1.6 Communication with Applications

In the course of executing actions, a digital page may launch other applications. When a digital page launches an application with which it may have continuing interaction, it maintains a connection with the application (such as a socket). The digital page may launch an application (for example, a browser) on the user's peripheral via the output player. The output player returns to the digital page the information it needs (such as a socket name) to establish a direct connection with the application.

A digital page may also provide a mechanism to allow the user to establish a connection between itself and an already-running application. In other words, by interacting with the coded substrate, the user can give inputs to or receive outputs from a running application that is external to the digital page and not produced in conjunction with a printed document.

Also, results of one action, after being locally stored, can be input to another.

6.2 Output Actions

Here we describe one of a variety of available ways to implement the output actions attributed to a user such as Ariane.

6.2.1 Action 1: Text Output

Ariane is in doubt about the meaning of a word. She clicks on it; an explanatory note for the word is displayed on her TV screen.

The digital page is responsible for producing the explanatory note; how the note gets to Ariane's TV screen is the responsibility of the communication infrastructure.

The active action table contains a pair (W, E), where W is the region containing the word, and E is, for example (Output, Exp), where Output is a type meaning "display the data element of the action pair to the user" and Exp is the text of the explanation.

The digital page receives the position of Ariane's pointer. It looks up the position in the active action table and determines that it is in region W. It therefore executes action E, that is, outputs Exp, which is sent to the output player of Ariane's TV.

Note that, for this mechanism, the explanatory note can be provided by the publisher of the document a priori, and the word can be graphically identified as one that has an explanation. The ability to look up a word in an on-line dictionary would provide a definition for any word, without putting a burden on the publisher. Of course, the dictionary definition may not be identical to the hand-crafted explanatory note, which could take advantage of context. But in a great many cases, a dictionary definition would be valuable. In order to provide this, a general text-selection mechanism as described below in Section 6.5 can be used.

6.2.2 Action 2: Audio Output; Action Table Switching

Ariane clicks on the Recite box, then on the beginning of a line; the line is recited by Laurence Olivier over her TV speakers. The active action table contains an entry for the Recite box. Its action is of a different type; it affects the state of the digital page process. It makes the active action table inactive, and makes some other action table active—one that contains an entry for each line, as follows. The region element of an entry describes the region containing the line. The action entry has two parts. The first part says to output audio data (stored as part of the action), which is the recitation of the line by a famous actor. The second part restores the previous action table as the active action table.

Note that this mechanism of action tables, and changing active action tables, is only one implementation of many. Another general mechanism would be to associate operators and operands with regions, distinguishing between the types of objects. Action 1, Text Output, would bundle the necessary operand with the operator, so only one click is necessary For Action 2, one click would designate the reciting operation and a second click would designate the line as its operand.

This also could be done via text selection as opposed to a priori definition of the regions and provision of the recitations. It would require a reading of the play aligned to the text and segmented into lines; then selection of arbitrary text could trigger location of the point in the reading, the audio data from there to the end of the segment could be output.

6.2.3 Action 3: Video Output

Ariane clicks on the Play Scene box, then on the beginning of a scene, and a video of Orson Welles' interpretation of the scene is played on her TV.

This is just like the previous case, but the action table for the Play Scene box has entries appropriate to playing videos of scenes.

6.3 Annotating; Adding Actions

Various techniques can be used to enable a user to add links and actions to an already published page.

The example is the following: Ariane has previously connected to the Web pages provided with the coded substrate document that she's reading (Othello), by clicking on the Main Web Page box. As a result, she has a browser on her screen, open to one of these Web pages. She uses a normal pencil to make a note to herself on the page. She clicks on the Link To Web Page box. She clicks on the note she just wrote. Henceforth, clicking on her note causes the Web page to pop up on the screen.

A similar but slightly more general example is easier to illustrate, after which we'll return to the above. Consider: Ariane has a browser on her screen, open to an arbitrary Web page. She uses a normal pencil to make a note to herself on the page. She clicks on the Link To Web Page box. She clicks on the note she just wrote. A dialog box pops up on the screen. She copies the URL of the Web page from the browser to the dialog box and clicks "Apply" in the dialog box. Henceforth, clicking on her note causes the Web page to pop up on the screen.

The active action table contains an entry for the Link To Web Page box. Its first action changes the mode of the digital page. Rather than continuing in its normal event-driven mode, the digital page waits for the next click from the user. When it's received, the position P of the pointer is recorded, rather than being interpreted as a standard interaction (it is not looked up in the active action table, as would normally be the case). A region R of some conventional size with P at its centre is created. The above-described dialog box interaction is initiated, and the URL U given by the user is used as the data element of an action URL, U. The entry R, URL, U is added to the active action table. When the user subsequently clicks in the defined region, the standard action-table mechanisms will pop the Web page up on the screen.

An Add Action box would function in a very similar manner, the difference being that the digital page would not automatically interpret the data it gets from the dialog box as a URL. Instead, the user must provide a complete description of the action. For example, assuming actions are described as type, data pairs, the user could select the type from a menu and enter the data. A type "Program" that launches a program would provide a catch-all to allow virtually any type of action to be added.

In a further example, Ariane doesn't have to type in the URL because the digital page launched her browser, and thus can communicate directly with it. The browser provides its current URL when queried. Browsers that don't already have this functionality can be extended to provide it. Thus the dialog box interaction with the user can be replaced with an interaction between the digital page and the browser, while the rest of the scenario remains the same.

6.4 Using the Pointer as a Mouse

The pointer can be used as a mouse, and, more specifically, positional information at regular intervals can be treated as cursor ositions.

The example is: Ariane clicks on the Mouse Mode box and subsequently uses the pointer as a mouse, with the page as the mouse-pad.

The example can be modified so that the Mouse Mode box acts as a toggle; if she clicks on Mouse Mode when in Mouse Mode, the pointer returns to its non-Mouse-Mode mode of operation. Meanwhile, an application is running, displayed on Ariane's TV (more generally, on the user's local peripheral). The digital page has a connection to this application, either explicitly established by the user or because the application was launched by the digital page.

The standard mode of the pointer is to initiate communication with the digital page each time the user clicks, sending its current position and the click event. Thus in non-Mouse-Mode operation, the digital page gets the position of the pointer whenever the user clicks.

In Mouse Mode, the digital page gets the position of the pointer at regular intervals, without the user clicking (and with no click event transmitted). When the user does click, the click event and position are sent as usual.

How Its Done. The active action table contains an entry for the Mouse Mode box. Its actions follow: A command is sent to the pointer, to change its mode of operation. In the new mode, the pointer initiates communication every n timer ticks, sending the digital page its position each time, in addition to sending its position with a click event when the user clicks. This change of mode, and thus the need for the pointer to receive control information from the digital page, can be avoided at the cost of more communication traffic, by having the pointer always send its position every n ticks. In non-Mouse-Mode, the digital page would ignore positional information that is not accompanied by a click event. Alternatively, the pointer could distinguish itself whether it's in mouse-mode or non-mouse mode (e.g., the button is held down during mouse mode, or alternatively, positions are sent every n timer ticks when the pointer is moved in contact with the page).

The mode of the digital page process is changed, too. The first position RP that the digital page receives with no accompanying mouse click is recorded. A cursor is displayed on the output screen, because cursor display is one of the capabilities of the output player, and its position CP on the screen is recorded. Each time a position P is received, the difference between P and RP is computed. That difference is added to CP and the cursor is displayed at the new value of CP. RP is replaced by P, and the process iterates.

When the digital page receives a position P with a mouse click event, it updates CP and RP as usual, and in addition it forwards the mouse click event, with CP substituted for P, to the application. By "forwards the mouse click event" we mean that the digital page puts the same type of mouse click event (changing the position) in the application's event stream.

Of course, if the application is the digital page itself, these issues are absent.

Absolute Positioning. What has just been described is how to use positional information relative to the printed page frame to simulate a standard mouse. As a positioning interface, this has the advantage of being familiar to mouse users.

This is relative positioning: the user moves the pointer relative to the current position of the cursor, and the absolute position of the pointer on the page is irrelevant.

An alternative is absolute positioning. Here the user moves the pointer relative to the page frame; the absolute position of the pointer is crucial. If the user wants the cursor up near the top right-hand corner of the screen, the user can put the pointer near the top right-hand corner of the page.

If the page is the same size and shape as the screen, then the absolute position of the pointer relative to the page frame could be directly translated to the screen; this combines elements of using a mouse and pointing at a touch-screen.

The printed page is rarely the same size and shape as the screen. However, the page dimensions can be scaled to match the screen (or to match some window on the screen), and the position on the page can be interpreted according to the scaled dimensions as a position on the screen (or in the window).

6.5 Selecting Content

The user can use the pointer to select content from a printed page and make the content available as input to an action or application.

Section 6.2.1 explained that, in order to provide an explanatory note about a word, the note can be stored in the action table entry for the region around the word. The author can decide to provide a note for that word as part of the publication process. It is problematic to support cut and paste from a coded substrate page into another document, because one can't know ahead of time what chunks of text the user might want to cut. To help a foreign reader understand the document, for example, by allowing her to display a translation of some part of the text, it would not be feasible to translate the document into all languages. Machine translation could be offered as one option, but it cannot be known ahead of time what part of the text she'll need help with.

For a complete solution, isomorphism could be maintained between the physical page and the digital page. But simple text selection can be done using action tables.

A user may, for example, select a word or an object by double clicking on it.

This can be supported with an action table with an entry for each word and each selectable object. The region element of the entry describes the region bounding the word or object, and the action element is (Select, W), where W is the word or object, and the conventional selection action is to copy W to a clipboard.

The digital page uses this action table whenever it receives double clicks. The digital page can distinguish double clicks as such if a time-stamp is sent with each click event, as transmission times from the pointer to the digital page may not be uniform. Or the pointer could recognize the click type.

Another selection method, such as triple clicking to select a line, could be added by adding an action table with an entry for each line.

Finally, another common text selection method is to push the button down, drag the pointer, and release the button elsewhere. The digital page receives the position of the pointer at the two locations.

This selection method is not efficiently amenable to an action-table implementation (without a separate representation of content and a mapping from positions into that representation). An implementation analogous to the ones just described would require entries for all pairs of characters.

An example illustrates the concept of selecting content. The example, in which Ariane wants to have the word "exsufflicate" translated into French, is as follows:

She clicks on the box Translations on the top of the physical page. A special menu appears on the screen, giving a choice of several languages. She selects French. She now has a choice between either a word-in-context automatic translation or a number of standard literary translations. She selects Gide's translation, then directs the pointer to the difficult word. Gide's translation of the line appears on the screen, with the word(s) corresponding to "exsufflicate" singled out in boldface.

Note that the entire line is translated, though the user pointed to a single word.

This can be done with action tables as follows: The Translations box has an entry in the active action table, or its region is type Action; either way the action puts up the menus and collects the user's decisions. The digital page has access to Gide's translation, which is aligned sentence-for-sentence, and within each sentence, word for word, with Ariane's copy of Othello. Given a sentence number and the number of a word within the sentence, the translation function finds the corresponding sentence and word (or words) in the translated text. It boldfaces the word and returns the translation.

The sentence and word numbers cam be [rpvoded. for text identification, by an action table built specifically to support this function. It has an entry per word, containing the sentence number and word number.

6.6 Isomorphism

Coded substrate technology as described herein allows a person to interact with paper in much the same way as one could interact with a computer screen. A digital representation of an image that is isomorphic to the image printed on a page can enable a position on a printed page to be used as input to any computer application that can accept input in the form of position in a digital representation of an image. Examples include browsers, word processor, and substantially any application with a graphical user interface or for which a graphical user interface could be built.

Related techniques are described in copending, coassigned U.S. patent application Ser. No. 09/223,882, entitled "Multi-level Selection Methods and Apparatus Using Context Identification for Embedded Data Graphical User Interfaces", incorporated herein by reference.

As described above, the position of the pointer on the page can be delivered to the digital page. This positional data is analogous to the position of the mouse on the screen, which is the information that a standard computer application receives.

The mechanisms for implementing coded substrate technology actions differ from the mechanisms one would use for standard computer applications, notably due to the fact that the paper does not change as a screen does.

Two kinds of mechanisms could be used to implement actions such as Ariane's as described herein. In one, the complete image and content of the printed page is represented, as such, in the digital page, while in the other, only the actions are represented in the digital page. The latter is functionally weaker than the former, because its actions can only use content that has been associated with the action in advance. Arbitrary text selection is a case in point; it requires a representation of the content in the digital page.

Figure 14:
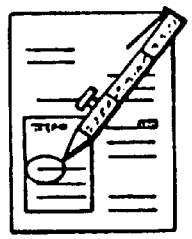
FIGS. 14 and 15 schematically illustrate isomorphism between physical (hardcopy) and electronic documents.
Figure 14:
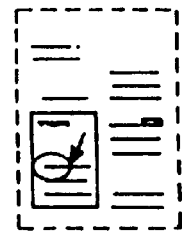
Figure 15:
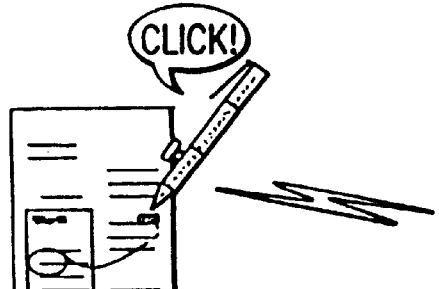
Figure 15:
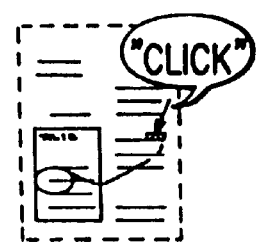

The former is referred to herein as isomorphism between the physical and digital page. Isomorphism is illustrated in FIGS. 14 and 15. FIG. 14 shows isomorphism in which selection of an entity on the physical page by positioning a pointer is coupled with selection of the counterpart entity in the digital page. FIG. 15 shows isomorphism in which using a pointer to indicate a destination position to which a selected entity is moved or copied is coupled with an indicating in the digital page of the counterpart position as a destination.

It is common practice to map from a position on the screen to a position in a digital document that has been rendered on the screen; this is what is done by browsers and text editors, for example.

To make use of a representation of the content of a printed page, it must be possible to map from a position on the page to a position in the digital representation.

This can be done by using a digital representation that is isomorphic to the printed page. In this way, positions on the page match one-for-one positions on the screen.

One can imagine the printed page reproduced on a screen. As the pointer is moved on the physical page, the cursor moves, simultaneously (modulo network delays) and in parallel. Button clicks on the pointer are treated as clicks on the mouse, as suggested in FIG. 15. The digital page process acts just as it would if the user were moving the cursor, and clicking, with the mouse.

Given this kind of parallelism, standard computer application techniques (such as those used in editors and browsers) may be used to implement Ariane's actions. Provision of support for those actions can be made using techniques known in the art.

This parallelism can be achieved by associating the digital page process with a special purpose window manager. This window manager manages the window displaying the page. The window size is identical to the page size. The window manager takes positional information from the pointer rather than the mouse—but this is transparent to the digital page process.

There is no need for this window to be rendered to a screen—it can be entirely virtual.

The isomorphism is between the image on the physical page and one aspect of the digital page: a digital representation of that image (or information from which such a representation can be constructed). The digital page contains more information, including the mapping from the image to the content and the actions to be performed.

Constructing a digital representation that looks like what you get when you print to paper was a difficult problem—most text editors and browsers display a document that differs on-screen to one degree or another from the printed version. Adobe PDF format provides page-description functionalities that are strong enough that the printed and digital representations truly look alike. Other page description formats may provide similarly.

A special-purpose window manager is just one way among many to take advantage of such an isomorphism. Another way would be to use a standard window manager, but to modify the positional and event information as it comes from the pointer so that it appears to the window manager to be a mouse event. This moves some of the special-purpose processing, and some elements of window-management, into the communication infrastructure, which would communicate with the window manager. Alternatively, positions can be interpreted directly by the digital page process. Window management per se (which window is on top, which application handles an event) isn't relevant.

But an event handler, which is typically provided by the window manager, would have to be incorporated into the digital page.

7. Special Applications 7.1 Writer-pointer.

Here, using the pointer disclosed in FIG. 11 which writes on coded substrates, the position of the pointer is monitored during hand-writing through the usual localisation device. This permits the marks to be registered in digital form simultaneously to their physical production by the writer, in a transparent way. Strokes made with the pointer can therefore be recognized and recorded for further use. This provides the following applications:

drawing on a coded substrate and getting a digital copy of the drawing, on which various operations can be later performed (smoothing, shape-recognition, etc.) As the pen movements are recorded in time, such as by associating timestamps with movements, the digital drawing is dynamic, as opposed to the case of scanning the final state of a drawing. This dynamicity might help a shape-recognition program identify a circle, a square, etc. There are also applications in signature authentication, by making the dynamics of the strokes a part of the signature.

taking hand-written notes during a meeting, which are later accessible in digital form; dynamicity may help perform hand-writing recognition, if an ascii representation of the text is desired.

writing (or drawing) on a flipchart, and keeping a digital copy; or writing with a marker on a white-board having a coded substrate, and keeping a digital copy.

filling multi-choice paper forms.

putting by hand editor's marks on a draft typescript and having these marks transmitted and interpreted on the digital side in order to produce a corrected version.

The writer-pointer could be implemented with a writing mode, in which the image containing positional information is transmitted at frequent regular intervals, and can be used to determine the position of the point. Interpolation may be used to derive a continuous or approximately continuous line in the coordinate space of the page, which may be recorded as a stroke on the digital page, as a series of positions or as a function derived from them using conventional drawing program techniques; alternatively, the digital representation could be modified or annotated.

7.2 Controlling access rights I

As has been discussed, coded substrates have a number of applications relating to interacting with services. As will be seen, they also have significant potential for control of access rights to data as well as to digital commerce.

Consider the representative case of a classical recording publishing company, Digital Grammophon, or DG; this company distributes musical recordings over the net, and it must find ways to have listeners pay for them. Coded substrate can help to solve this problem.

DG sells, through record or book shops, listening cards printed on coded substrate. One such card, for instance, lists the last six Mozart symphonies. Each movement is listed as a subheading under the corresponding symphony heading. The customer buys the card, goes back home, clicks on the heading for the 40th, and the music is played for him on his hi-fi peripheral device.

This scheme is not commercially secure for the DG company with respect to an unscrupulous user intent on defeating copyrights:

Such a user might legally buy a listening card for the symphonies and reproduce, through standard photocopying, its printed content on thousands of cards, and distribute these through parallel channels. Of course, this scheme will not work. A buyer of such a card will not be able to use it in any way. It is instructive to compare this situation with the case where the cards produced by DG would be printed on conventional paper, and where marks printed on these cards, such as barcodes, would encode the addresses of the music tracks. In this case, a standard photocopy of the original card would be functionally indistinguishable from this original card.

Such a user might become more sophisticated and produce perfect copies of the original card, including the coded substrate (an operation, which, by the way, may be illegal if coded substrates were a monopoly of a coded substrate supplier).

Although such an operation would be technically difficult and costly, it might not be impossible. However, DG can easily prevent such a problem. Each piece of coded substrate has a unique identification number page-id, which is associated at the DG site with the digital representation of the page (this is of course a many-to-one mapping). Because of this unique identification for each physical card, DG can detect two simultaneous access attempts through the same page-id, and knows that this event corresponds to an illegal situation. This is an example of a "valid request criterion", meaning a criterion that can be applied to distinguish valid requests from invalid requests.

Upon detecting an invalid request, DG can then take measures of different degrees of severity. A drastic measure would be to void the guilty page-id of any future access rights. Under such a scheme, people buying the illegal copies would be quickly discouraged.

Other less severe schemes could be implemented, such as putting limits on how many cumulative hours a given page-id could be used each day, or on the total number of times it could be used in its lifetime. These schemes would obviously have broader commercial implications than just preventing piracy: for example, one could buy the right to listen 10 times to the "Jupiter" symphony.

7.3 Controlling access rights II

But where the user is not to be discouraged by the measures in section 7.2 above, he may make a further attempt to cheat the DG company.

Suppose the user has noticed that all the DG cards for the Mozart symphonies bear consecutive page-id numbers. From buying one such card, she can therefore predict what the thousands of DG cards for these recordings look like. She then goes on and produces cards that have the right page-id numbers on them.

Now this move is potentially dangerous for DG. There is no obvious valid request criterion that it can apply to distinguish a card bought legally from a card bought from the unscrupulous user.

But there is a radical counter-measure that DG, with support from the coded substrate supplier, can take. The coded substrate supplier, rather than simply encoding a page-id number in the white coded substrate sheets it sells to DG, now pairs the page-id with a hash-code page-id-code. The function mapping a page-id into the page-id-code is a secret property of the coded substrate supplier; it may be implemented in a variety of ways: through a random number generator, a secret hash-coding algorithm, or a public-key-cryptography scheme. Although there are some differences between these various approaches, what is crucial for the current problem is the following thing: the page-id-code cannot be predicted from the page-id by a person outside of the coded substrate supplier. On the other hand, the coded substrate supplier, when selling coded substrates sheets to DG, provides DG with a list of  pairs, so that DG knows the code associated with any sheet of coded substrates it owns and can apply a corresponding valid request criterion.

Now the unscrupulous user, even if he is able to predict which page-id numbers will be used for the Mozart symphonies, has no way to know the page-id-code numbers associated with these pages. The only way she could know these numbers would be by buying all the DG cards corresponding to the symphonies, a somewhat uncongenial prospect.

We thus see that, while coded substrates may still be copiable, given the aforementioned additional technology, with a page-identifier coding scheme, it becomes unforgeable: in order to produce a usable card, the pirate needs to own an original for that card.

It should be noted here that the idea of privately encoding the page identifiers does not strictly require the coded substrate medium. It could also be implemented via conventional printed marks on the card. Although this might already be an interesting possibility in itself, the coded substrate medium fits the bill very well here, because one generic architecture (paper, pointer, net infrastructure), already employed in several other functions, can be readily adapted to the case at hand. The only modification of the original scheme consists in adding a page-id-code to the page-id during the production phase at the coded substrate supplier, an operation with minimal supplementary cost.

Another access rights example is as follows. The user buys stamp at local news-stand, transfers its code to mail-order house, mail-order house transfers code to the bank.

Suppose the coded substrate supplier, under the supervision of a commercial bank, produces small pieces of adhesive coded substrates, shaped like post stamps, and printed in various denominations (10cts,1$,10$, etc.). These stamps are sold, under a sealed wrapper, at the bank offices, through local newsstands, etc. Using coded substrate technology, the stamps are provided with a unique page-id and with a corresponding page-id-code as described above. The pair  is known only to the bank.

A customer wishes to purchase some catalogue item through a mail-order company. She buys enough stamps to cover her order, sticks them on an empty space provided next to the item in the catalogue, and then, using the pointer, clicks first on the item, then on each of the stamps. The action of clicking on a stamp has the effect of transferring the  pair to the mail-order company. The mail-order company can then transfer these codes to the emitting bank, which credits the mail-order company's account for an amount equal to the stamp denomination. The bank will accept an operation with a given  pair only once: Any attempt to re-use this pair for a later operation will be rejected as failing to meet the applicable valid request criterion, so that each stamp can effectively be used for payment only once in its lifetime. After valid payment has been confirmed by the bank to the mail-order company, the item is sent to the customer.

The procedure just sketched uses simple coded substrate technology, a form of commercial transaction—which preserves the anonymity of the buyer of stamps—can be provided relatively easily.

Variations

The implementations described above could be varied in many ways within the scope of the invention.

Implementations described above use DataGlyphs to encode action/medium identifiers, but various other machine-readable markings could be used. For visually nonobstructive markings, it is desirable to have markings for which the shape of a pattern or collection of markings appears uniform to the eye under normal viewing conditions even if one of the markings changes value.

Implementations described above use pointers that include cameras or handheld scanners to obtain input signals that include information about machine-readable markings, but any other appropriate detection devices and circuitry could be used, including detection devices that are not handheld.

Implementations described above provide input signals to processing circuitry when they are received and actions are produced immediately, but the invention could be implemented in a way that stores input signals from one or more scans in the pointer temporarily, possibly in a compressed form. Later, the pointer is docked to a host, which could be a computer, a phone, a fax machine, or the like, and the stored input signals are provided for decoding by the host's processor and production of actions without the need of communicating the stored signals immediately to a network, and therefore permitting simpler or cheaper input devices.

Implementations described above produce actions through the Internet, but the invention could be implemented to produce actions through any suitable network.

The implementations described above use marking media that are sheets of paper, but any other appropriate marking media could be used.

Implementations described above use action/medium identifiers of several different types, including globally unique page identifiers and sticker identifiers, page identifiers paired with location identifiers, document identifiers paired with action identifiers, and so forth. Various other action/medium identifiers could be used within the scope of the invention, including, for example, network-wide page identifiers.

Implementations described above use obtain action identifiers of several types from action/medium identifiers, including taking part or all of the action/medium identifier as the action identifier, but action identifiers could be obtained in various other ways, including decoding.

Implementations described above obtain network addresses for peripherals using sticker identifiers provided to a router, but network addresses for peripherals could be obtained in various other ways. Similarly, network addresses for an action device such as a server could be obtained in various ways other than those described above.

Implementations described above involve printed documents on coded substrates, but the invention could be implemented with marking media that are not coded and with documents that are handwritten or produced in some way other than printing.

Implementations described above attempt to maintain isomorphism between a physical page and a digital page, but the invention can be implemented without isomorphism, and could be used to obtain any action that can be produced through a network.

It will be appreciated that the techniques described herein may also be used in conjunction with the related techniques described in copending, coassigned U.S. patent application Ser. No. 09/276,532, entitled "Obtaining and Using Data Associating Annotating Activities With Portions of Recordings", and Ser. No. 09/276,084 entitled "Obtaining Network Addresses from Identifiers", both incorporated herein by reference.

In implementations described above, specific acts are performed that could be omitted or performed differently.

In implementations described above, acts are performed in an order that could be modified in some cases.

Implementations described above use currently available machine-readable marking, detection, computing, and networking techniques, but could readily be modified to use newly discovered techniques as they become available.

Applications

The invention could be applied in various ways.

The invention could be applied in a synchronous mode to provide interactive books, magazines, maps, pocket encyclopedias, product catalogues, examination forms, paper address books, and so forth.

The invention could be applied in an asynchronous mode to allow collection of bookmarks while reading a document such as a newspaper or magazine, after which the bookmarks could be used in a batch to retrieve email clippings or print additional information.

Because the pointer behaves like a paper mouse, it can be used to record manual movements in real time, such as drawing or writing motions. Handwritten notes taken during a meeting or during making or playing of a recording can be captured and processed, handwritten faxes can be sent without using a computer, and freeform information requests can be written in an input rectangle inside an advertisement and transmitted to the sponsor for feedback.

Miscellaneous

The further description of features of the invention set forth in Dymetman, M., and Copperman, M., "Intelligent Papers", in *Proceedings of Electronic Publishing '98*, April 1998, Saint Malo, France, Springer-Verlag, 1998, pp. 392–406, is incorporated herein by reference.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. An article of manufacture for obtaining automatic actions through a network using processing circuitry for connecting to the network and detection circuitry for providing input signals to the processing circuitry, the automatic actions being provided by action devices connected to the network; the article comprising:

an area of a marking medium; and machine-readable markings within the area of the marking medium that encode an action/medium identifier; the machine-readable markings being decodable to obtain the action/medium identifier by the processing circuitry using input signals from the detection circuitry, the input signals including information defining the machine-readable markings; the action/medium identifier specifying (a) an action device using a globally unique identifier that identifies the, marking medium and (b) an action using a location identifier that identifies a zone of the area of the marking medium; the processing circuitry being adapted to provide the location identifier through the network to the action device to produce the action; the action relating to the zone of the area of the marking medium; the action device providing the action automatically in response to the location identifier.

2. The article of claim 1 in which the action/medium identifier is provided to a first machine by the processing circuitry to obtain first and second network addresses, the first network address being a network address of the action device for the action, the second network address being a network address of a peripheral device connected to the network; the first network address can used to provide the action position identifier and the second network address to the action device; the action device being able to respond by performing the action to obtain output data and using the second network address to provide the output data to the peripheral device.

3. The article of claim 1 in which the detection device is an image input device and the machine-readable markings that encode the action/medium identifier are invisible.

4. The article of claim 1 in which the detection device is an image input device and the machine-readable markings are visually nonobstructive markings.

5. The article of claim 1 in which the area of the marking medium is a page and the action/medium identifier includes a page identifier that identifies the page.

6. The article of claim 5 in which the action device includes digital data defining a counterpart image of the page.

7. The article of claim 6 in which the counterpart image is isomorphic with the page.

8. The article of claim 6 in which the action device is capable of providing data for presentation on a display, the action being to provide the digital data for presentation of the counterpart image of the page on a display.

9. The article of claim 5 in which the location identifier identifies a location of a zone within the page.

10. The article of claim 9 in which the zone includes a first section and a second section; the first section including a first set of the machine-readable markings that encode the page identifier; the second section including a second set of the machine-readable markings that encode the location identifier.

11. The article of claim 9 in which the zone further includes an orientation marking indicating orientation of the page.

12. The article of claim 11 in which the area of the marking medium includes a first position and a second position; a first set of the machine-readable markings that encode the document identifier being at the first position; a second set of the machine-readable markings that encode the location identifier being at the second position.

13. The article of claim 1 in which the area of marking medium is a sticker and the action/medium identifier includes a sticker identifier that identifies the sticker.

14. The article of claim 1 in which the action/medium identifier includes a medium identifier and an access control code derived from the medium identifier using a secret function.

15. The article of claim 1 in which the area of the marking medium is part of a hardcopy document and the action/medium identifier includes a document identifier that identifies the hardcopy document.

16. A method of providing automatic actions through a network, the automatic actions being provided by action devices connected to the network; the method comprising:

receiving input signals from a detection device, the input signals including information defining machine-readable markings in an area of a marking medium; the area of the marking medium including machine-readable markings that encode an action/medium identifier;

using the input signals, decoding the machine-readable markings to obtain the action/medium identifier;

using the action/medium identifier to specify: (a) an action device using a globally unique identifier that identifies the marking medium and (b) an action using a location identifier that identifies a zone of the area of the marking medium; and providing the location identifier through the network to the action device for producing the action; the action relating to the zone of the area of the marking medium;

the action device providing the action automatically in response to the location identifier.

17. The method of claim 16 in which the area of the marking medium is a page and the action/medium identifier includes a page identifier; the action device including digital data defining a counterpart image of the page.

18. The method of claim 17 in which the action is to provide the digital data; the method further comprising:
using the digital data to present the counterpart image of the page on a display.

19. The method of claim 18, further comprising:
receiving second input signals from the detection device, the second input signals including information defining machine-readable markings in a second area of the marking medium; the second area of the marking medium including machine-readable markings that encode a second action/medium identifier; the second action/medium identifier identifying a second action and being usable to obtain a second position identifier that can be provided through the network to the action device to produce the second action; the second action/medium identifier further identifying the marking medium and a location within the marking medium; the second position identifier identifying the location;
using the second input signals, decoding the machine-readable markings to obtain the second action/medium identifier;
using the second action/medium identifier to obtain the second position identifier; and
providing the second position identifier through the network to the action device; the action device providing the second action automatically in response to the second position identifier.

20. The method of claim 19 in which the second area of the marking medium includes human-readable markings indicating presence of a link to a network address; the second action following the link to the network address.

21. The method of claim 16 in which the action is an action that produces output data; the act of providing the position identifier through the network to the action device comprising:
providing the action/medium identifier to a first machine to obtain first and second network addresses, the first network address being a network address of the action device for the action, the second network address being a network address of a peripheral device connected to the network; and
using the first network address to provide the position identifier and the second network address to the action device; the action device responding by performing the action to obtain output data and using the second network address to provide the output data to the peripheral device.

22. The method of claim 21 in which the first machine is a router.

23. The method of claim 16 in which the action device, before providing the action, determines whether the position identifier meets a valid request criterion; the action device providing the action only if the valid request criterion is met.

24. The method of claim 16 in which the position identifier includes a medium identifier and an access control code derived from the medium identifier using a secret function; the action device, before providing the action, using the position identifier to determine whether the access control code is derived from the medium identifier using the secret function; the action device providing the action only if the access control code is derived from the medium identifier using the secret function.

25. The method of claim 16 in which the action is an action that produces output data; the method further comprising:

receiving additional input signals from the detection device, the additional input signals including information defining machine-readable markings in an area of a second marking medium; the area of the second marking medium including machine-readable markings that encode a peripheral identifier; the peripheral identifier identifying a peripheral device connected to the network; and
using the additional input signals, decoding the machine-readable markings to obtain the peripheral identifier;
the act of providing the position identifier through the network to the action device comprising:
providing the action/medium identifier and the peripheral identifier to a first machine to obtain first and second network addresses, the first network address being a network address of the action device for the action, the second network address being a network address of the peripheral device; and
using the first network address to provide the position identifier and the second network address to the action device; the action device responding by performing the action to obtain output data and using the second network address to provide the output data to the peripheral device.

26. A system for providing automatic actions through a network, the automatic actions being provided by action devices connected to the network; the system comprising:
detection circuitry for providing input signals including information defining machine-readable markings in an area of a marking medium; the area of the marking medium including machine-readable markings that encode an action/medium identifier; and
processing circuitry connected for receiving the input signals and connected to the network; the processing circuitry, in response to the input signals:
using the input signals, decoding the machine-readable markings to obtain the action/medium identifier;
using the action/medium identifier to specify: (a) an action device using a globally unique identifier that identifies the marking medium and (b) an action using a location identifier that identifies a zone of the area of the marking medium; and
providing the location identifier through the network to the action device for producing the action; the action relating to the zone of the area of the marking medium; the action device providing the action automatically in response to the location identifier.

27. The system of claim 26, further comprising a pointer; the pointer including the detection circuitry.

28. The system of claim 25 in which the pointer further includes a user input device for providing user signals; the detection circuitry providing the input signals in response to a user signal from the user input device.

29. The system of claim 28 in which the pointer further includes a marking element; the processing circuitry further operating to:
obtain, for a series of images defined by the input signals, time data indicating the times at which the images occurred.

30. The system of claim 27 in which the detection circuitry is image input circuitry, the input signals being image signals defining an image of the area of the marking medium.

31. The system of claim 27 in which the pointer is handheld.

* * * * *